United States Patent [19]
Fresko et al.

[11] Patent Number: 5,966,702
[45] Date of Patent: Oct. 12, 1999

[54] METHOD AND APPARATUS FOR PRE-PROCESSING AND PACKAGING CLASS FILES

[75] Inventors: Nedim Fresko; Richard Tuck, both of San Francisco, Calif.

[73] Assignee: Sun Microsystems, Inc., Palo Alto, Calif.

[21] Appl. No.: 08/961,874

[22] Filed: Oct. 31, 1997

[51] Int. Cl.[6] .................................................. G06F 17/30

[52] U.S. Cl. ................................ 707/1; 707/7; 707/103; 707/10

[58] Field of Search .............................. 707/7, 103, 100, 707/102, 200, 10

[56] References Cited

U.S. PATENT DOCUMENTS

| | | | |
|---|---|---|---|
| 5,303,149 | 4/1994 | Janigian | 364/408 |
| 5,367,675 | 11/1994 | Cheng et al. | 395/600 |
| 5,488,725 | 1/1996 | Turtle et al. | 395/600 |
| 5,548,758 | 8/1996 | Pirahesh et al. | 395/600 |
| 5,717,915 | 2/1998 | Stolfo et al. | 395/605 |
| 5,732,265 | 3/1998 | Dewitt et al. | 395/616 |
| 5,813,009 | 9/1998 | Johnson et al. | 707/100 |
| 5,826,265 | 10/1998 | Van Huben et al. | 707/8 |
| 5,829,006 | 10/1998 | Parvathaneny et al. | 707/101 |
| 5,838,965 | 11/1998 | Kavanagh et al. | 395/614 |

*Primary Examiner*—Anton Fetting
*Assistant Examiner*—Michael J. Wallace, Jr.
*Attorney, Agent, or Firm*—Hecker & Harriman

[57] ABSTRACT

A method and apparatus for pre-processing and packaging class files. Embodiments remove duplicate information elements from a set of class files to reduce the size of individual class files and to prevent redundant resolution of the information elements. Memory allocation requirements are determined in advance for the set of classes as a whole to reduce the complexity of memory allocation when the set of classes are loaded. The class files are stored in a single package for efficient storage, transfer and processing as a unit. In an embodiment, a pre-processor examines each class file in a set of class files to locate duplicate information in the form of redundant constants contained in a constant pool. The duplicate constant is placed in a separate shared table, and all occurrences of the constant are removed from the respective constant pools of the individual class files. During pre-processing, memory allocation requirements are determined for each class file, and used to determine a total allocation requirement for the set of class files. The shared table, the memory allocation requirements and the reduced class files are packaged as a unit in a multi-class file.

23 Claims, 6 Drawing Sheets

METHOD AND APPARATUS FOR PRE-PROCESSING AND PACKAGING CLASS FILES

BACKGROUND OF THE INVENTION

1. Field of the Invention

This invention relates to the field of computer software, and, more specifically, to object-oriented computer applications.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

With advancements in network technology, the use of networks for facilitating the distribution of media information, such as text, graphics, and audio, has grown dramatically, particularly in the case of the Internet and the World Wide Web. One area of focus for current developmental efforts is in the field of web applications and network interactivity. In addition to passive media content, such as HTML definitions, computer users or "clients" coupled to the network are able to access or download application content, in the form of applets, for example, from "servers" on the network.

To accommodate the variety of hardware systems used by clients, applications or applets are distributed in a platform-independent format such as the Java® class file format. Object-oriented applications are formed from multiple class files that are accessed from servers and downloaded individually as needed. Class files contain bytecode instructions. A "virtual machine" process that executes on a specific hardware platform loads the individual class files and executes the bytecodes contained within.

A problem with the class file format and the class loading process is that class files often contain duplicated data. The storage, transfer and processing of the individual class files is thus inefficient due to the redundancy of the information. Also, an application may contain many class files, all of which are loaded and processed in separate transactions. This slows down the application and degrades memory allocator performance. Further, a client is required to maintain a physical connection to the server for the duration of the application in order to access class files on demand.

These problems can be understood from a review of general object-oriented programming and an example of a current network application environment.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. Some object-oriented programming languages support multiple inheritance where a subclass may inherit a class definition from more than one parent class. Other programming languages support only single inheritance, where a subclass is limited to inheriting the class definition of only one parent class. The Java programming language also provides a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

An object is a generic term that is used in the object-oriented programming environment to refer to a module that contains related code and variables. A software application can be written using an object-oriented programming language whereby the program's functionality is implemented using objects.

A Java program is composed of a number of classes and interfaces. Unlike many programming languages, in which a program is compiled into machine-dependent, executable program code, Java classes are compiled into machine independent bytecode class files. Each class contains code and data in a platform-independent format called the class file format. The computer system acting as the execution vehicle contains a program called a virtual machine, which is responsible for executing the code in Java classes. The virtual machine provides a level of abstraction between the machine independence of the bytecode classes and the machine-dependent instruction set of the underlying computer hardware. A "class loader" within the virtual machine is responsible for loading the bytecode class files as needed, and either an interpreter executes the bytecodes directly, or a "just-in-time" (JIT) compiler transforms the bytecodes into machine code, so that they can be executed by the processor. FIG. 1 is a block diagram illustrating a sample Java network environment comprising a client platform 102 coupled over a network 101 to a server 100 for the purpose of accessing Java class files for execution of a Java application or applet.

Sample Java Network Application Environment

In FIG. 1, server 100 comprises Java development environment 104 for use in creating the Java class files for a given application. The Java development environment 104 provides a mechanism, such as an editor and an applet viewer, for generating class files and previewing applets. A set of Java core classes 103 comprise a library of Java classes that can be referenced by source files containing other/new Java classes. From Java development environment 104, one or more Java source files 105 are generated. Java source files 105 contain the programmer readable class definitions, including data structures, method implementations and references to other classes. Java source files 105 are provided to Java compiler 106, which compiles Java source files 105 into compiled ".class" files 107 that contain bytecodes executable by a Java virtual machine. Bytecode class files 107 are stored (e.g., in temporary or permanent storage) on server 100, and are available for download over network 101.

Client platform 102 contains a Java virtual machine (JVM) 111 which, through the use of available native operating system (O/S) calls 112, is able to execute bytecode class files and execute native O/S calls when necessary during execution.

Java class files are often identified in applet tags within an HTML (hypertext markup language) document. A web server application 108 is executed on server 100 to respond to HTTP (hypertext transport protocol) requests containing URLs (universal resource locators) to HTML documents, also referred to as "web pages." When a browser application executing on client platform 102 requests an HTML document, such as by forwarding URL 109 to web server 108, the browser automatically initiates the download of the class files 107 identified in the applet tag of the HTML document. Class files 107 are typically downloaded from the server and loaded into virtual machine 111 individually as needed.

It is typical for the classes of a Java program to be loaded as late during the program's execution as possible; they are loaded on demand from the network (stored on a server), or from a local file system, when first referenced during the Java program's execution. The virtual machine locates and loads each class file, parses the class file format, allocates memory for the class's various components, and links the class with other already loaded classes. This process makes the code in the class readily executable by the virtual machine.

The individualized class loading process, as it is typically executed, has disadvantages with respect to use of storage resources on storage devices, allocation of memory, and execution speed and continuity. Those disadvantages are magnified by the fact that a typical Java application can contain hundreds or thousands of small class files. Each class file is self-contained. This often leads to information redundancy between class files, for example, with two or more class files sharing common constants. As a result, multiple classes inefficiently utilize large amounts of storage space on permanent storage devices to separately store duplicate information. Similarly, loading each class file separately causes unnecessary duplication of information in application memory as well. Further, because common constants are resolved separately per class during the execution of Java code, the constant resolution process is unnecessarily repeated.

Because classes are loaded one by one, each small class requires a separate set of dynamic memory allocations. This creates memory fragmentation, which wastes memory, and degrades allocator performance. Also, separate loading "transactions" are required for each class. The virtual machine searches for a class file either on a network device, or on a local file system, and sets up a connection to load the class and parse it. This is a relatively slow process, and has to be repeated for each class. The execution of a Java program is prone to indeterminate pauses in response/execution caused by each class loading procedure, especially, when loading classes over a network. These pauses create a problem for systems in which interactive or real-time performance is important.

A further disadvantage of the individual class loading process is that the computer executing the Java program must remain physically connected to the source of Java classes during the duration of the program's execution. This is a problem especially for mobile or embedded computers without local disk storage or dedicated network access. If the physical connection is disrupted during execution of a Java application, class files will be inaccessible and the application will fail when a new class is needed. Also, it is often the case that physical connections to networks such as the Internet have a cost associated with the duration of such a connection. Therefore, in addition to the inconvenience associated with maintaining a connection throughout application execution, there is added cost to the user as a result of the physical connection.

A Java archive (JAR) format has been developed to group class files together in a single transportable package known as a JAR file. JAR files encapsulate Java classes in archived, compressed format. A JAR file can be identified in an HTML document within an applet tag. When a browser application reads the HTML document and finds the applet tag, the JAR file is downloaded to the client computer and decompressed. Thus, a group of class files may be downloaded from a server to a client in one download transaction. After downloading and decompressing, the archived class files are available on the client system for individual loading as needed in accordance with standard class loading procedures. The archived class files remain subject to storage inefficiencies due to duplicated data between files, as well as memory fragmentation due to the performance of separate memory allocations for each class file.

SUMMARY OF THE INVENTION

A method and apparatus for pre-processing and packaging class files is described. Embodiments of the invention remove duplicate information elements from a set of class files to reduce the size of individual class files and to prevent redundant resolution of the information elements. Memory allocation requirements are determined in advance for the set of classes as a whole to reduce the complexity of memory allocation when the set of classes are loaded. The class files are stored in a single package for efficient storage, transfer and processing as a unit.

In an embodiment of the invention, a pre-processor examines each class file in a set of class files to locate duplicate information in the form of redundant constants contained in a constant pool. The duplicate constant is placed in a separate shared table, and all occurrences of the constant are removed from the respective constant pools of the individual class files. During pre-processing, memory allocation requirements are determined for each class file, and used to determine a total allocation requirement for the set of class files. The shared table, the memory allocation requirements and the reduced class files are packaged as a unit in a multi-class file.

When a virtual machine wishes to load the classes in the multi-class file, the location of the multi-class file is determined and the multi-class file is downloaded from a server, if needed. The memory allocation information in the multi-class file is used by the virtual machine to allocate memory from the virtual machine's heap for the set of classes. The individual classes, with respective reduced constant pools, are loaded, along with the shared table, into the virtual machine. Constant resolution is carried out on demand on the respective reduced constant pools and the shared table.

DETAILED DESCRIPTION OF THE INVENTION

The invention is a method and apparatus for pre-processing and packaging class files. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Embodiment of Computer Execution Environment (Hardware)

Figure 1:
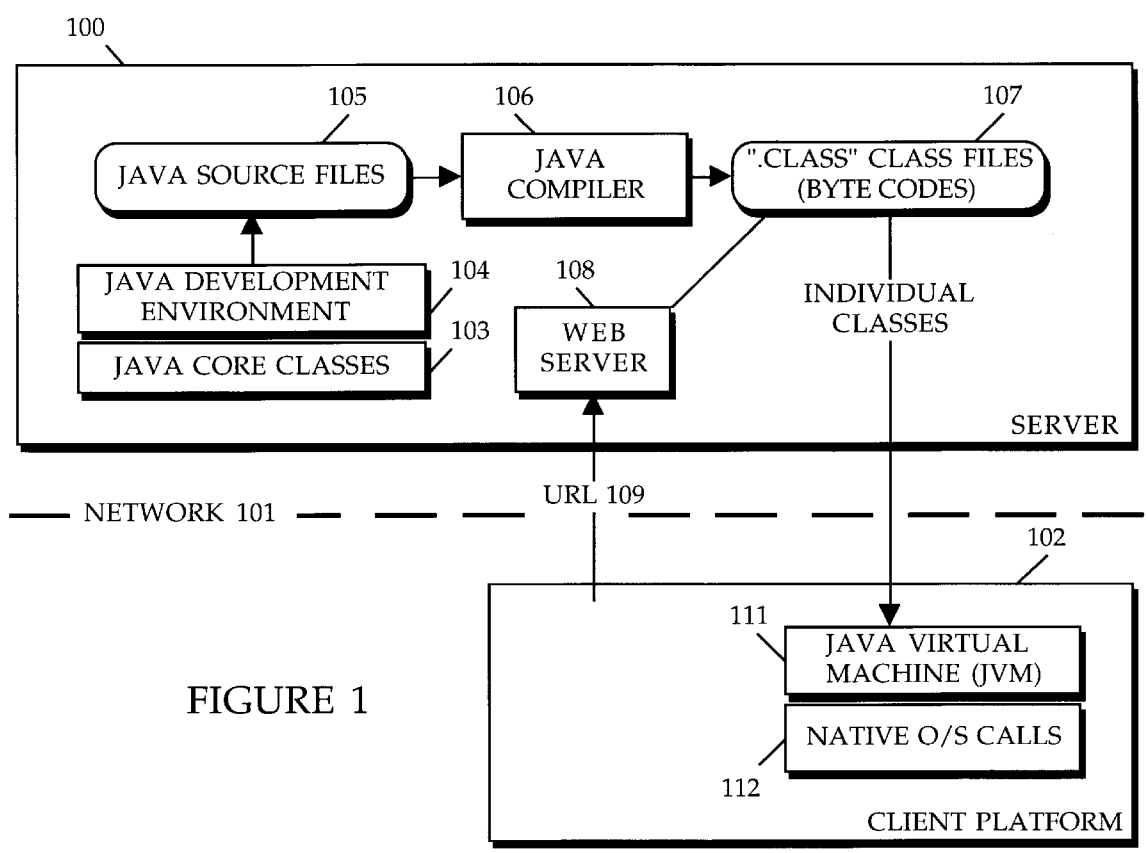
FIG. 1 is an embodiment of a Java network application environment.
Figure 2:
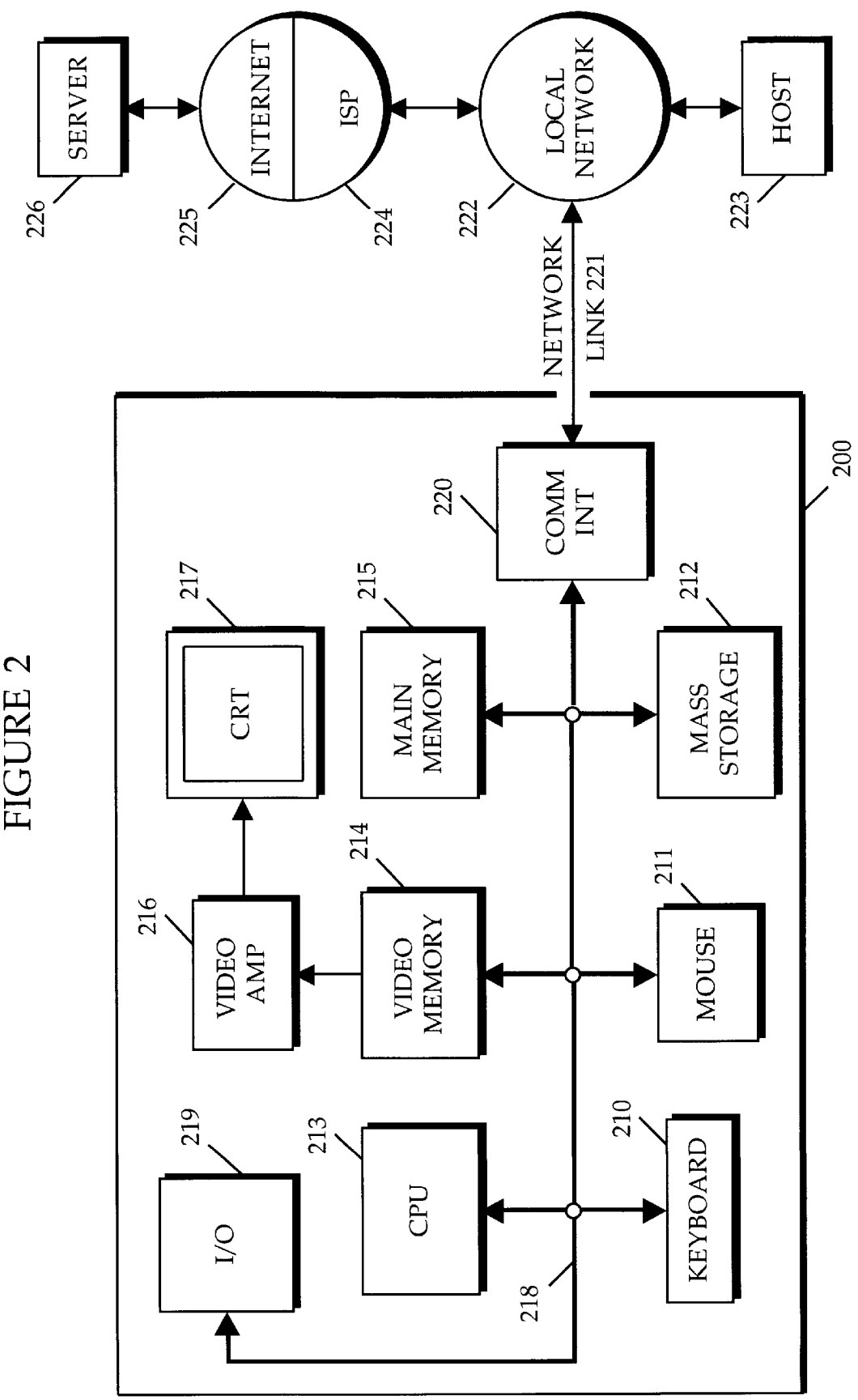
FIG. 2 is a block diagram of an embodiment of a computer system capable of providing a suitable execution environment for an embodiment of the invention.

An embodiment of the invention can be implemented as computer software in the form of computer readable program code executed on a general purpose computer such as computer 200 illustrated in FIG. 2, or in the form of bytecode class files executable by a virtual machine running on such a computer. A keyboard 210 and mouse 211 are coupled to a bi-directional system bus 218. The keyboard and mouse are for introducing user input to the computer system and communicating that user input to central processing unit (CPU) 213. Other suitable input devices may be used in addition to, or in place of, the mouse 211 and keyboard 210. I/O (input/output) unit 219 coupled to bi-directional system bus 218 represents such I/O elements as a printer, A/V (audio/video) I/O, etc.

Computer 200 includes a video memory 214, main memory 215 and mass storage 212, all coupled to bidirectional system bus 218 along with keyboard 210, mouse 211 and CPU 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 32-bit data bus for transferring data between and among the components, such as CPU 213, main memory 215, video memory 214 and mass storage 212. Alternatively, multiplex data/address lines may be used instead of separate data and address lines.

In one embodiment of the invention, the CPU 213 is a microprocessor manufactured by Motorola®, such as the 680X0 processor or a microprocessor manufactured by Intel®, such as the 80X86, or Pentium® processor, or a SPARC® microprocessor from Sun Microsystems®. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network 222 to host computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. The signals through the various networks and the signals on network link 221 and through communication interface 220, which carry the digital data to and from computer 200, are exemplary forms of carrier waves transporting the information.

Computer 200 can send messages and receive data, including program code, through the network(s), network link 221, and communication interface 220. In the Internet example, server 226 might transmit a requested code for an application program through Internet 225, ISP 224, local network 222 and communication interface 220. In accord with the invention, one such downloaded application is the apparatus for pre-processing and packaging class files described herein.

The received code may be executed by CPU 213 as it is received, and/or stored in mass storage 212, or other non-volatile storage for later execution. In this manner, computer 200 may obtain application code in the form of a carrier wave.

The computer systems described above are for purposes of example only. An embodiment of the invention may be implemented in any type of computer system or programming or processing environment.

Class File Structure

Embodiments of the invention can be better understood with reference to aspects of the class file format. Description is provided below of the Java class file format. Also, enclosed as Section A of this specification are Chapter 4, "The class File Format," and Chapter 5, "Constant Pool Resolution," of *The Java Virtual Machine Specification*, by Tim Lindholm and Frank Yellin, published by Addison-Wesley in September 1996, ©Sun Microsystems, Inc.

The Java class file consists of a stream of 8-bit bytes, with 16-bit, 32-bit and 64-bit structures constructed from consecutive 8-bit bytes. A single class or interface file structure is contained in the class file. This class file structure appears as follows:

```
ClassFile  {
    u4 magic;
    u2 minor_version;
    u2 major_version;
    u2 constant_pool_count;
    cp_info constant_pool[constant_pool_count-1];
    u2 access_flags;
    u2 this_class;
    u2 super_class;
    u2 interfaces_count;
    u2 interfaces[interfaces_count];
    u2 fields_count;
    field_info fields[fields_count];
    u2 methods_count;
    method_info methods[methods_count];
    u2 attributes_count;
    attribute_info attributes[attributes_count];
}
``` where u2 and u4 refer to unsigned two-byte and four-byte quantities. This structure is graphically illustrated in FIG. 3.

Figure 3:
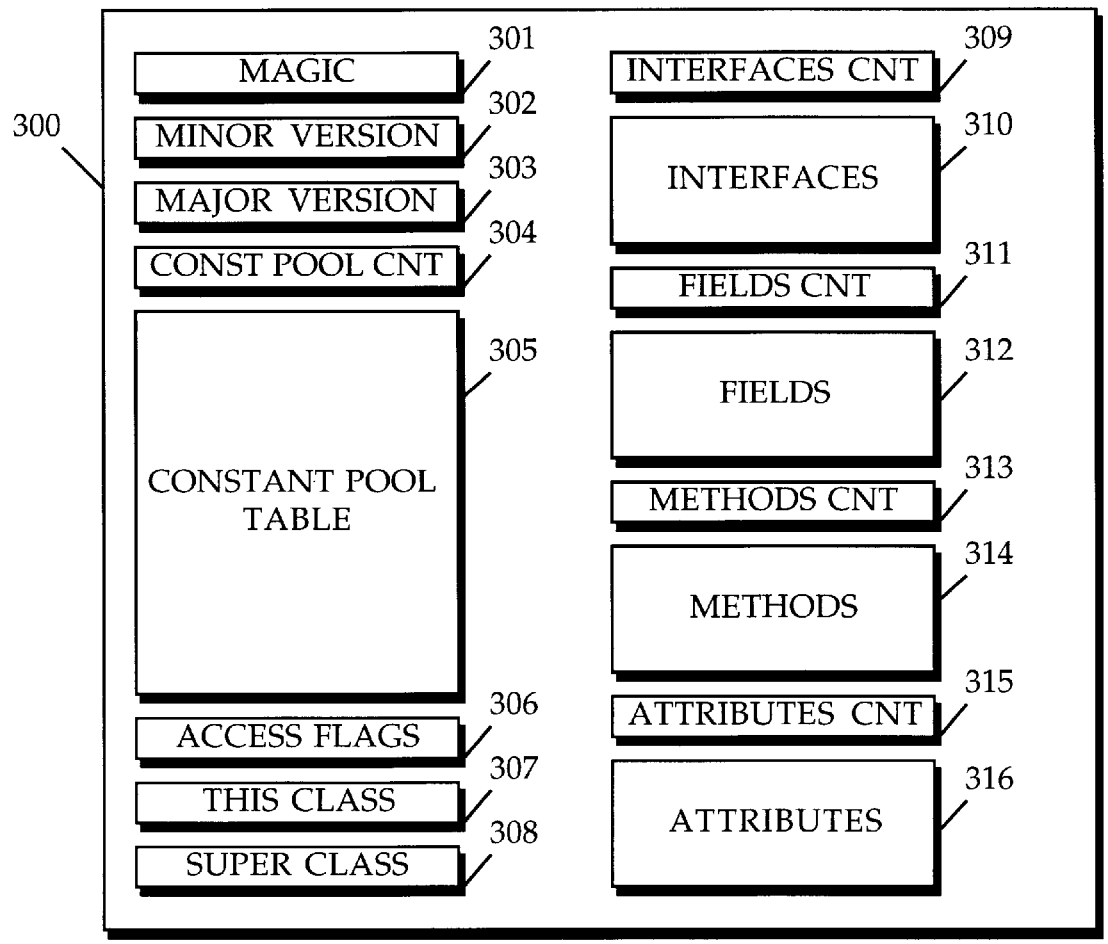
FIG. 3 is a block diagram of an embodiment of a class file format.

In FIG. 3, class file 300 comprises four-byte magic value 301, two-byte minor version number 302, two-byte major version number 303 , two-byte constant pool count value 304, constant pool table 305 corresponding to the constant pool array of variable length elements, two-byte access flags value 306, two-byte "this class" identifier 307, two-byte super class identifier 308, two-byte interfaces count value 309, interfaces table 310 corresponding to the interfaces array of two-byte elements, two-byte fields count value 311, fields table 312 corresponding to the fields array of variable length elements, two-byte methods count value 313, methods table 314 corresponding to the methods array of variable length elements, two-byte attributes count value 315, and attributes table 316 corresponding to the attributes array of variable-length elements. Each of the above structures is briefly described below.

Magic value 301 contains a number identifying the class file format. For the Java class file format, the magic number has the value 0xCAFEBABE. The minor version number 302 and major version number 303 specify the minor and major version numbers of the compiler responsible for producing the class file.

The constant pool count value 304 identifies the number of entries in constant pool table 305. Constant pool table 305 is a table of variable-length data structures representing various string constants, numerical constants, class names, field names, and other constants that are referred to within the ClassFile structure. Each entry in the constant pool table has the following general structure:

```
cp_info  {
    u1 tag;
    u1 info[ ];
}
``` where the one-byte "tag" specifies a particular constant type. The format of the info[ ] array differs based on the constant type. The info[ ] array may be a numerical value such as for integer and float constants, a string value for a string constant, or an index to another entry of a different constant type in the constant pool table. Further details on the constant pool table structure and constant types are available in Chapter 4 of Section A.

Access flags value 306 is a mask of modifiers used with class and interface declarations. The "this class" value 307 is an index into constant pool table 305 to a constant type structure representing the class or interface defined by this class file. The super class value 308 is either zero, indicating the class is a subclass of java.lang.Object, or an index into the constant pool table to a constant type structure representing the superclass of the class defined by this class file.

Interfaces count value 309 identifies the number of direct superinterfaces of this class or interface, and accordingly, the number of elements in interfaces table 310. Interfaces table 310 contains two-byte indices into constant pool table 305. Each corresponding entry in constant pool table 305 is a constant type structure representing an interface which is a direct superinterface of the class or interface defined by this class file.

The fields count value 311 provides the number of structures in fields table 312. Each entry in fields table 312 is a variable-length structure providing a description of a field in the class type. Fields table 312 includes only those fields that are declared by the class or interface defined by this class file.

The methods count value 313 indicates the number of structures in methods table 314. Each element of methods table 314 is a variable-length structure giving a description of, and virtual machine code for, a method in the class or interface.

The attributes count value 315 indicates the number of structures in attributes table 316. Each element in attributes table 316 is a variable-length attribute structure. Attribute structures are discussed in section 4.7 of Section A.

Embodiments of the invention examine the constant pool table for each class in a set of classes to determine where duplicate information exists. For example, where two or more classes use the same string constant, the string constant may be removed from each class file structure and placed in a shared constant pool table. In the simple case, if N classes have the same constant entry, N units of memory space are taken up in storage resources. By removing all constant entries and providing one shared entry, N−1 units of memory space are freed. The memory savings increase with N. Also, by implementing a shared constant table, entries in the constant table need be fully resolved at most once. After the initial resolution, future code references to the constant may directly use the constant.

Pre-processing and Packaging Classes

Figure 4:
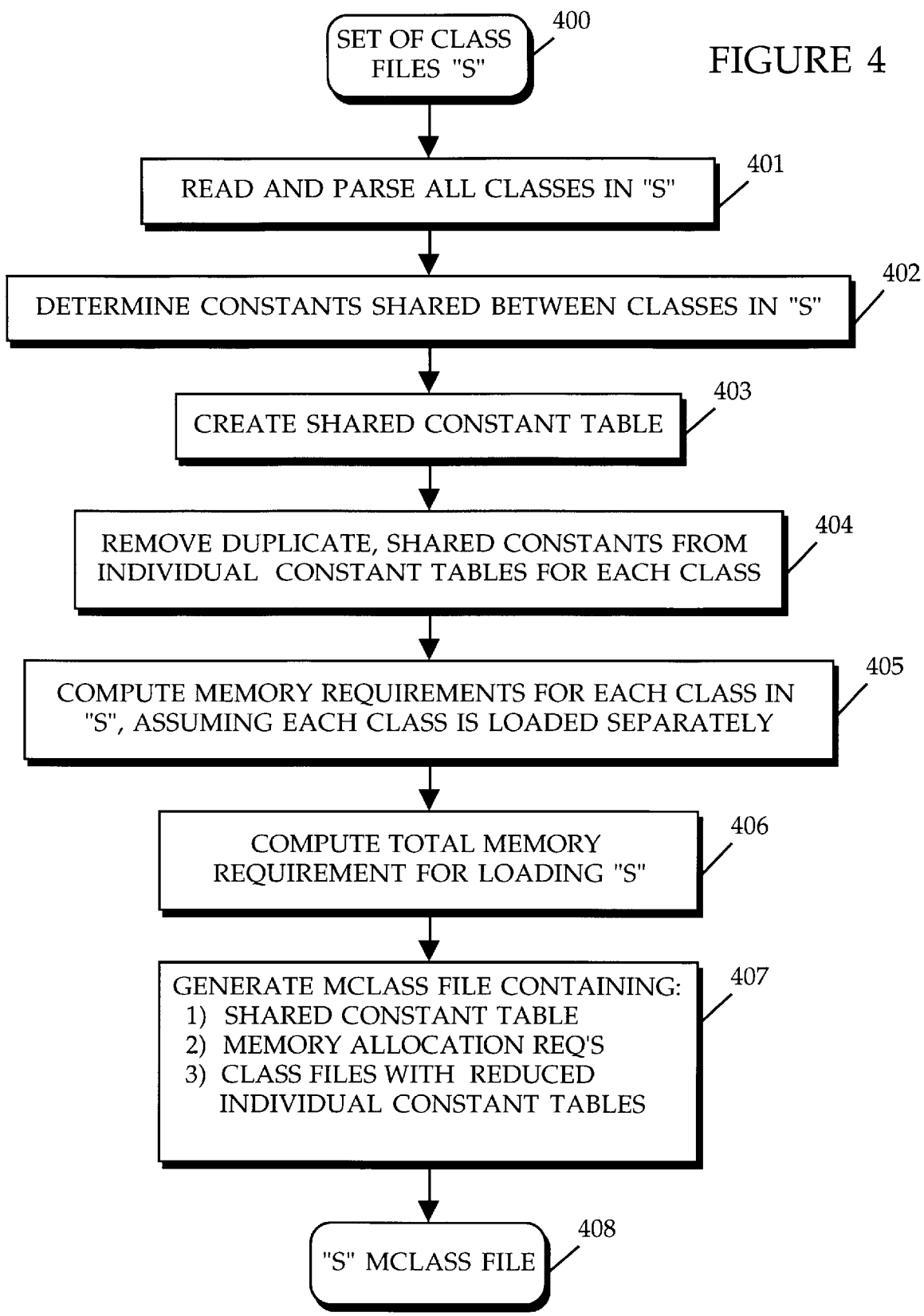
FIG. 4 is a flow diagram of a class file pre-processing method in accordance with an embodiment of the invention.

An embodiment of the invention uses a class pre-processor to package classes in a format called an "mclass" or multi-class file. A method for pre-processing and packaging a set of class files is illustrated in the flow diagram of FIG. 4.

The method begins in step 400 with a set of arbitrary class files "S" (typically part of one application). In step 401, the pre-processor reads and parses each class in "S." In step 402, the pre-processor examines the constant pool tables of each class to determine the set of class file constants (such as strings and numerics, as well as others specific to the class file format) that can be shared between classes in "S." A shared constant pool table is created in step 403, with all duplicate constants determined from step 402. In step 404, the pre-processor removes the duplicate, shared constants from the individual constant pool tables of each class.

In step 405, the pre-processor computes the in-core memory requirements of each class in "S," as would normally be determined by the class loader for the given virtual machine. This is the amount of memory the virtual machine would allocate for each class, if it were to load each class separately. After considering all classes in "S" and the additional memory requirement for the shared constant pool table, the total memory requirement for loading "S" is computed in step 406.

In step 407, the pre-processor produces a multi-class (mclass) file that contains the shared constant pool table created in step 403, information about memory allocation requirements determined in steps 405 and 406, and all classes in "S," with their respective reduced constant pool tables. The mclass file for the class set "S" is output in step 408. In some embodiments, to further reduce the size of the multi-class file, the multi-class file may be compressed.

An example of one embodiment of a multi-class file structure may be represented as follows:

```
McclassFile {
    u2 shared_pool_count;
    cp_info shared_pool[shared_pool_count-1];
    u2 mem_alloc_req;
    u2 classfile_count;
    ClassFile classfiles[classfile_count];
}
```

In one embodiment of the invention, a new constant type is defined with a corresponding constant type tag. The new constant type provides as its info[ ] element an index into the shared constant table. During pre-processing, duplicated constant elements are placed in the shared constant pool as a shared element, and an element of the new constant type replaces the duplicated element in the reduced pool to direct constant resolution to the shared element in the shared constant pool. Reduction occurs because the replacement element is just a pointer to the actual constant placed in the shared constant pool.

Figure 5:
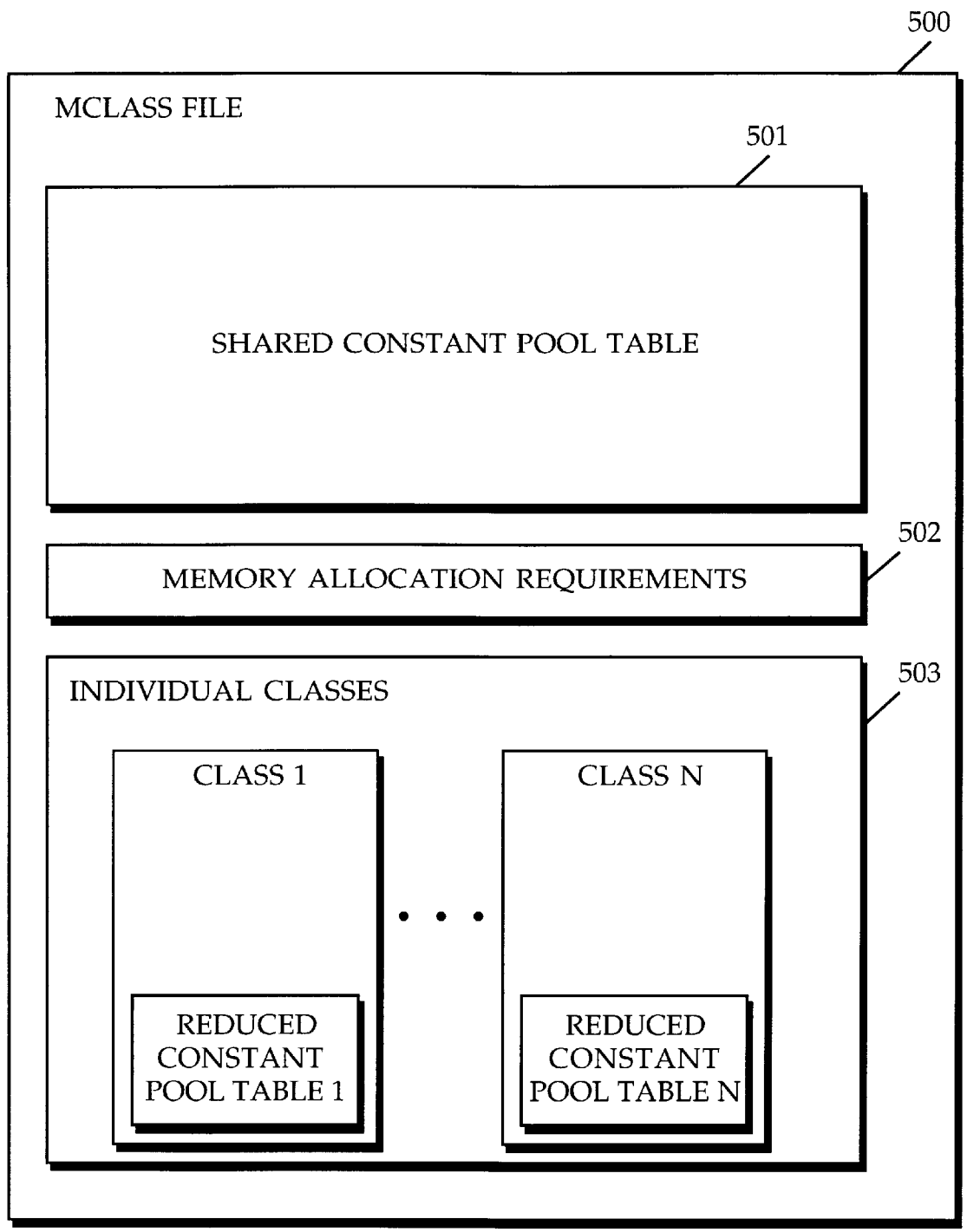
FIG. 5 is a block diagram of an multi-class file format in accordance with an embodiment of the invention.

FIG. 5 is a simplified block diagram of an embodiment of the multi-class file format. Mclass file 500 comprises shared constant pool table 501, memory allocation requirements 502 and the set of individual classes 503. The set of individual classes 503 comprises the class file structures for classes 1–N (N being the number of classes in the set), along with the corresponding reduced constant pool tables 1–N. The size of the shared constant pool table 501 is dependent on the number of duplicate constants found in the set of classes. The memory allocation requirements 502 may be represented as a single value indicating the total memory needed to load all class structures (classes 1–N) in individual classes 503, as well as the shared constant pool table 501. The shared pool count and classfile count (not shown in FIG. 5) identify the number of elements in the shared constant pool table 501 and the classfiles array of ClassFile structures (represented by classes 503), respectively.

The multi-class file is typically considerably smaller than the sum of the sizes of the individual class files that it was derived from. It can be loaded by the virtual machine during or prior to the execution of an application, instead of having to load each contained class on demand. The virtual machine is also able to take advantage of the allocation requirements information to pre-allocate all required memory for the multi-class set. This solves many of the problems associated with class loading.

Classes in a multi-class set share information between classes, and therefore are smaller. This provides the following advantages:

a) the classes take up less space on servers or storage devices;
b) the classes take less network or file transfer time to read;
c) the classes take up less memory when loaded; and
d) execution is faster, since shared constants are resolved at most once.

Multi-class sets consolidate the loading of required classes instead of loading the classes one by one. Using allocation information, only one dynamic memory allocation is needed instead of multiple allocation operations. This results in less fragmentation, less time spent in the allocator, and less waste of memory space.

Because the class files are consolidated in a single multi-class file, only a single transaction is needed to perform a network or file system search, to set up a transfer session (e.g., HTTP) and to transfer the entire set of classes. This minimizes pauses in the execution that can result from such transactions and provides for deterministic execution, with no pauses for class loading during a program run. Also, once the multi-class file is loaded and parsed, there is no need for the computer executing the program to remain connected to the source of the classes.

Figure 6:
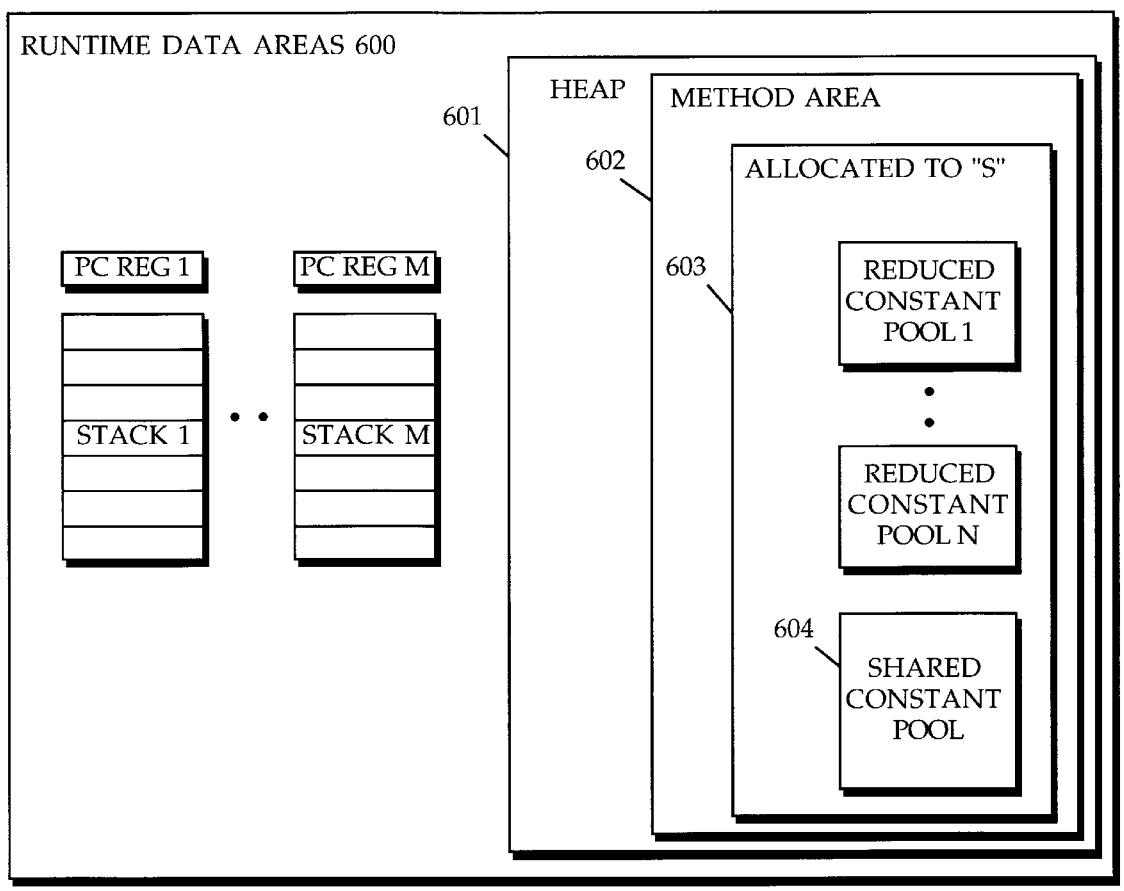
FIG. 6 is a block diagram of the runtime data areas of a virtual machine in accordance with an embodiment of the invention.

FIG. 6 illustrates the runtime data areas of the virtual machine when a multi-class file is processed and loaded in accordance with an embodiment of the invention. In FIG. 6, runtime data areas 600 comprise multiple program counter registers (PC REG 1–M) and multiple stacks 1–M. One program counter register and one stack are allocated to each thread executing in the virtual machine. Each program counter register contains the address of the virtual machine instruction for the current method being executed by the respective thread. The stacks are used by the respective threads to store local variables, partial results and an operand stack.

Runtime data areas 600 further comprise heap 601, which contains method area 602. Heap 601 is the runtime data area from which memory for all class instances and arrays is allocated. Method area 602 is shared among all threads, and stores class structures such as the constant pool, field and method data, and the code for methods. Within method area 602, memory block 603, which may or may not be contiguous, is allocated to the multi-class set of classes "S." Other regions in heap 601 may be allocated to "S" as well. Reduced constant pools 1–N, along with shared constant pool 604, reside within block 603.

Due to the removal of redundant constants in accordance with an embodiment of the invention, the size of block 603 required to contain reduced constant pools 1–N and shared constant pool 604 is much smaller than would be required to accommodate constant pools 1–N, were they not reduced. Also, the allocations in block 603 are much less fragmented (and may be found in contiguous memory) than the memory that would be allocated were the classes to be loaded one by one.

Thus, a method and apparatus for pre-processing and packaging class files has been described in conjunction with one or more specific embodiments. The invention is defined by the claims and their full scope of equivalents.

CHAPTER 4

The Class File Format

This chapter describes the Java Virtual Machine class file format. Each class file contains one Java type, either a class or an interface. Compliant Java Virtual Machine implementations must be capable of dealing with all class files that conform to the specification provided by this book.

A class file consists of a stream of 8-bit bytes. All 16-bit, 32-bit, and 64-bit quantities are constructed by reading in two, four, and eight consecutive 8-bit bytes, respectively. Multibyte data items are always stored in big-endian order, where the high bytes come first. In Java, this format is supported by inter-faces java.io.DataInput and java.io..DataOutput and classes such as java.io.DataInputStream and java.io.DataOutputStream.

This chapter defines its own set of data types representing Java class file data: The types u1, u2, and u4 represent an unsigned one-, two-, or four-byte quantity, respectively. In Java, these types may be read by methods such as readUnsignedByte, readUnsignedShort, and readint of the interface java.io.DataInput.

The Java class file format is presented using pseudostructures written in a C-like structure notation. To avoid confusion with the fields of Java Virtual Machine classes and class instances, the contents of the structures describing the Java class file format are referred to as items. Unlike the fields of a C structure, successive items are stored in the Java class file sequentially, without padding or alignment.

Variable-sized tables, consisting of variable-sized items, are used in several class file structures. Although we will use C-like array syntax to refer to table items, the fact that tables are streams of varying-sized structures means that it is not possible to directly translate a table index into a byte offset into the table.

Where we refer to a data structure as an array, it is literally an array.

4.1 ClassFile

A class file contains a single ClassFile structure:

```
ClassFile {
    u4 magic;
    u2 minor_version;
    u2 major_version;
    u2 constant_pool_count;
    cp_info constant_pool[constant_pool_count-1];
    u2 access_flags;
    u2 this_class;
    u2 super_class;
    u2 interfaces_count;
    u2 interfaces[interfaces_count]
    u2 fields_count;
    field_info fields[fields_count]
    u2 methods_count;
    method_info methods[methods_count];
    u2 attributes_count;
    attribute_info attributes [attributes_count];
}
```

The items in the ClassFile structure are as follows:

magic

The magic item supplies the magic number identifying the class file format; it has the value 0xCAFEBABE.

minor_version, major_version

The values of the minor_version and major_version items are the minor and major version numbers of the compiler that produced this class file. An implementation of the Java Virtual Machine normally supports class files having a given major version number and minor version numbers 0 through some particular minor_version.

If an implementation of the Java Virtual Machine supports some range of minor version numbers and a class file of the same major version but a higher minor version is encountered, the Java Virtual Machine must not attempt to run the newer code. However, unless the major version number differs, it will be feasible to implement a new Java Virtual Machine that can run code of minor versions up to and including that of the newer code.

A Java Virtual Machine must not attempt to run code with a different major version. A change of the major version number indicates a major incompatible change, one that requires a fundamentally different Java Virtual Machine.

In Sun's Java Developer's Kit (JDK) 1.0.2 release, documented by this book, the value of major_version is 45. The value of minor_version is 3. Only Sun may define the meaning of new class file version numbers.

constant_pool_count

The value of the constantsool_count item must be greater than zero. It gives the number of entries in the constant_pool table of the class file, where the constant_pool entry at index zero is included in the count but is not present in the constant_pool table of the class file. A constant_pool index is considered valid if it is greater than zero and less than constant_pool_count.

constant_pool[ ]

The constant_pool is a table of variable-length structures (§4.4) representing various string constants, class names, field names, and other constants that are referred to within the ClassFile structure and its substructures.

The first entry of the constant_pool table, constant_pool [0], is reserved for internal use by a Java Virtual Machine implementation. That entry is not present in the class file. The first entry in the class file is constant_pool [1].

Each of the constant_pool table entries at indices 1 through constant_pool_count_1 is a variable-length structure (§4.4) whose format is indicated by its first "tag" byte.

access_flags

The value of the access_flags item is a mask of modifiers used with class and interface declarations. The access_flags modifiers are shown in Table 4.1.

| Flag Name | Value | Meaning | Used By |
|---|---|---|---|
| ACC_PUBLIC | 0x0001 | Is public; may be accessed from outside its package. | Class, interface |
| ACC_FINAL | 0x0010 | Is final; no subclasses allowed. | Class |
| ACC_SUPER | 0x0020 | Treat superclass methods specially in invokespecial. | Class, interface |
| ACC_INTERFACE | 0x0200 | Is an interface. | Interface |
| ACC_ABSTRACT | 0x0400 | Is abstract; may not be instantiated. | Class, interface |

An interface is distinguished by its ACC_INTERFACE flag being set. If ACC_INTERFACE is not set, this class file defines a class, not an interface.

Interfaces may only use flags indicated in Table 4.1 as used by interfaces. Classes may only use flags indicated in Table 4.1 as used by classes. An interface is implicitly abstract (§2.13.1); its ACC_ABSTRACT flag must be set. An interface cannot be final; its implementation could never be completed (§2.13.1) if it were, so it could not have its ACC_FINAL flag set.

The flags ACC_FINAL and ACC_ABSTRACT cannot both be set for a class; the implementation of such a class could never be completed (§2.8.2).

The setting of the ACC_SUPER flag directs the Java Virtual Machine which of two alternative semantics for its invokespecial instruction to express; it exists for backward compatibility for code compiled by Sun's older Java compilers. All new implementations of the Java Virtual Machine should implement the semantics for invokespecial documented in Chapter 6, *"Java Virtual Machine Instruction Set."* All new compilers to the Java Virtual Machine's instruction set should set the ACC_SUPER flag. Sun's older Java compilers generate ClassFile flags with ACC_SUPER unset. Sun's older Java Virtual Machine implementations ignore the flag if it is set.

All unused bits of the access_flags item, including those not assigned in Table 4.1, are reserved for future use. They should be set to zero in generated class files and should be ignored by Java Virtual Machine implementations.

this_class

The value of the this_class item must be a valid index into the constant_pool table. The constant_pool entry at that index must be a CONSTANT_Class_info (§4.4.1) structure representing the class or interface defined by this class file.

super_class

For a class, the value of the super_class item either must be zero or must be a valid index into the constant_pool table. If the value of the super_class item is nonzero, the constant_pool entry at that index must be a CONSTANT_Class_info (§4.4.1) structure representing the superclass of the class defined by this class file. Neither the superclass nor any of its superclasses may be a final class.

If the value of super_class is zero, then this class file must represent the class java.lang.Object, the only class or interface without a superclass.

For an interface, the value of super_class must always be a valid index into the constant_pool table. The constant_pool entry at that index must be a CONSTANT_Class_info structure representing the class java.lang.Object.

interfaces_count

The value of the interfaces_count item gives the number of direct superinterfaces of this class or interface type.

interfaces[ ]

Each value in the interfaces array must be a valid index into the constant_pool table. The constant_pool entry at each value of interfaces [i], where 0 £ i < interfaces_count, must be a CONSTANT_Class_info (§4.4.1) structure representing an interface which is a direct superinterface of this class or interface type, in the left-to-right order given in the source for the type.

fields_count

The value of the fields_count item gives the number of field_info structures in the fields table. The field_info (§4.5) structures represent all fields, both class variables and instance variables, declared by this class or interface type.

fields[ ]

Each value in the fields table must be a variable-length field_info(§4.5) structure giving a complete description of a field in the class or interface type. The fields table includes only those fields that are declared by this class or interface. It does not include items representing fields that are inherited from superclasses or superinterfaces.

methods_count

The value of the methods_count item gives the number of method_info structures in the methods table.

methods[ ]

Each value in the methods table must be a variable-length method_info (§4.6) structure giving a complete description of and Java Virtual Machine code for a method in the class or interface.

The method_info structures represent all methods, both instance methods and, for classes, class (static) methods, declared by this class or interface type. The methods table only includes those methods that are explicitly declared by this class. Interfaces have only the single method <clinit>, the interface initialization method (§3.8). The methods table does not include items representing methods that are inherited from superclasses or superinterfaces.

attributes_count

The value of the attributes_count item gives the number of attributes (§4.7) in the attributes table of this class.

attributes[ ]

Each value of the attributes table must be a variable-length attribute structure. A ClassFile structure can have any number of attributes (§4.7) associated with it.

The only attribute defined by this specification for the attributes table of a ClassFile structure is the SourceFile attribute (§4.7.2).

A Java Virtual Machine implementation is required to silently ignore any or all attributes in the attributes table of a ClassFile structure that it does not recognize. Attributes not defined in this specification are not allowed to affect the semantics of the class file, but only to provide additional descriptive information (§4.7.1).

4.2 Internal Form of Fully Qualified Class Names

Class names that appear in class file structures are always represented in a fully qualified form (§2.7.9). These class names are always represented as CONSTANT_Utf8_info (§4.4.7) structures, and they are referenced from those CONSTANT_NameAndType_info (§4.4.6) structures that have class names as part of their descriptor (§4.3, as well as from all CONSTANT_Class_info (§4.4.1) structures.

For historical reasons the exact syntax of fully qualified class names that appear in class file structures differs from the familiar Java fully qualified class name documented in §2.7.9. In the internal form, the ASCII periods ('.') that normally separate the identifiers (§2.2) that make up the fully qualified name are replaced by ASCII forward slashes ('/'). For example, the normal fully qualified name of class Thread is java.lang.Thread. In the form used in descriptors in class files, a reference to the name of class Thread is implemented using a CONSTANT_Utf8_info structure representing the string "java/lang/Thread".

4.3 Descriptors

A descriptor is a string representing the type of a field or method.

4.3.1 Grammar Notation

Descriptors are specified using a grammar. This grammar is a set of productions that describe how sequences of characters can form syntactically correct descriptors of various types. Terminal symbols of the grammar are shown in bold fixed-width font. Nonterminal symbols are shown in italic type. The definition of a nonterminal is introduced by the name of the nonterminal being defined, followed by a colon. One or more alternative right-hand sides for the nonterminal then follow on succeeding lines. A nonterminal symbol on the right-hand side of a production that is followed by an asterisk (*) represents zero or more possibly different values produced from that nonterrinal, appended without any intervening space.

4.3.2 Field Descriptors

A field descriptor represents the type of a class or instance variable. It is a series of characters generated by the grammar:

FieldDescriptor:
    FieldType

ComponentType:
    FieldType

FieldType:
    BaseType
    ObjectType
    ArrayType

BaseType:
    B
    C
    D
    F
    I
    J
    S
    Z

ObjectType:
    L<classname>;

ArrayType:
    [ComponentType

The characters of BaseType, the L and; of ObjectType, and the [ of ArrayType are all ASCII characters. The <classname> represents a fully qualified class name, for instance, java.lang.Thread. For historical reasons it is stored in a class file in a modified internal form (§4.2).

The meaning of the field types is as follows:

| | | |
|---|---|---|
| B | byte | signed byte |
| C | char | character |
| D | double | double-precision IEEE 754 float |
| F | float | single-precision IEEE 754 float |
| I | int | integer |
| J | long | long integer |
| L<classname>; | ... | an instance of the class |
| S | short | signed short |
| Z | boolean | true or false |
| [ | ... | one array dimension |

For example, the descriptor of an int instance variable is simply I. The descriptor of an instance variable of type Object is Ljava/lang/Object;. Note that the internal form of the fully qualified class name for class Object is used. The descriptor of an instance variable that is a multidimensional double array, double d[ ] [ ] [ ];

is

[ [ [D 4.3.3 Method Descriptors

A parameter descriptor represents a parameter passed to a method:

ParameterDescriptor:
    FieldType

A method descriptor represents the parameters that the method takes and the value that it returns:

MethodDescriptor:
    (ParameterDescriptor*)ReturnDescriptor

A return descriptor represents the return value from a method. It is a series of characters generated by the grammar:

ReturnDescriptor:
    FieldType
    V

The character V indicates that the method returns no value (its return type is void). Otherwise, the descriptor indicates the type of the return value.

A valid Java method descriptor must represent 255 or fewer words of method parameters, where that limit includes the word for this in the case of instance method invocations. The limit is on the number of words of method parameters and not on the number of parameters themselves; parameters of type long and double each use two words.

For example, the method descriptor for the method

Object mymethod(int i, double d, Thread t)

is (IDLjava/lang/Thread;)Ljava/lang/Object;

Note that internal forms of the fully qualified class names of Thread and Object are used in the method descriptor.

The method descriptor for mymethod is the same whether mymethod is static or is an instance method. Although an instance method is passed this, a reference to the current class instance, in addition to its intended parameters, that fact is not reflected in the method descriptor. (A reference to this is not passed to a static method.) The reference to this is passed implicitly by the method invocation instructions of the Java Virtual Machine used to invoke instance methods.

4.4 Constant Pool

All constant_pool table entries have the following general format:

```
cp_info {
    u1 tag;
    u1 info [ ];
}
```

Each item in the constant_pool table must begin with a 1-byte tag indicating the kind of cp_info entry. The contents of the info array varies with the value of tag. The valid tags and their values are listed in Table 4.2

| Constant Type | Value |
|---|---|
| CONSTANT_Class | 7 |
| CONSTANT_Fieldref | 9 |
| CONSTANT_Methodref | 10 |
| CONSTANT_InterfaceMethodref | 11 |
| CONSTANT_String | 8 |
| CONSTANT_Integer | 3 |
| CONSTANT_Float | 4 |
| CONSTANT_Long | 5 |
| CONSTANT_Double | 6 |
| CONSTANT_NameAndType | 12 |
| CONSTANT_Utf8 | 1 |

Each tag byte must be followed by two or more bytes giving information about the specific constant. The format of the additional information varies with the tag value.

4.4.1 CONSTANT_Class

The CONSTANT_Class_info structure is used to represent a class or an interface:

```
CONSTANT_Class_info {
    u1 tag;
    u2 name_index;
}
```

The items of the CONSTANT_Class_info structure are the following:

tag

The tag item has the value CONSTANT_Class (7).

name_index

The value of the name_index item must be a valid index into the constant_pool table. The constant_pool entry at that index must be a CONSTANT_Utf8_info (§4.4.7) structure representing a valid fully qualified Java class name (§2.8.1) that has been converted to the class file's internal form (§4.2).

Because arrays are objects, the opcodes anewarray and multianewarray can reference array "classes" via CONSTANT_Class_info (§4.4.1) structures in the constant_pool table. In this case, the name of the class is the descriptor of the array type. For example, the class name representing a two-dimensional int array type;

int[ ] [ ]

is

[[I

The class name representing the type array of class Thread;

Thread[ ]

is

[Ljava.lang.Thread;

A valid Java array type descriptor must have 255 or fewer array dimensions.

4.4.2 CONSTANT_Fieldref, CONSTANT_Methodref, and CONSTANT_InterfaceMethodref

Fields, methods, and interface methods are represented by similar structures:

```
CONSTANT_Fieldref_info {
    u1 tag;
    u2 class_index;
    u2 name_and_type_index;
}
```

-continued

```
CONSTANT_Methodref_info {
    u1 tag;
    u2 class_index;
    u2 name_and_type_index;
}
CONSTANT_InterfaceMethodref_info {
    u1 tag;
    u2 class_index;
    u2 name_and_type_index;
}
```

The items of these structures are as follows:

tag

The tag item of a CONSTANT_Fieldref_info structure has the value CONSTANT_Fieldref (9).

The tag item of a CONSTANT_Methodref_info structure has the value CONSTANT_Methodref (10).

The tag item of a CONSTANT_InterfaceMethodref_info structure has the value CONSTANT_InterfaceMethodref (11).

class_index

The value of the class_index item must be a valid index into the constant_pool table. The constant_pool entry at that index must be a CONSTANT_Class_info (§4.4.1) structure representing the class or interface type that contains the declaration of the field or method.

The class_index item of a CONSTANT_Fieldref_info or a CONSTANT_Methodref_info structure must be a class type, not an interface type. The class_index item of a CONSTANT_InterfaceMethodref_info structure must be an interface type that declares the given method.

name_and_type_index

The value of the name_and_type_index item must be a valid index into the constant_pool table. The constant_pool entry at that index must be a CONSTANT_NameAndType_info (§4.4.6) structure. This constant_pool entry indicates the name and descriptor of the field or method.

If the name of the method of a CONSTANT_Methodref_info or CONSTANT_InterfaceMethodref_info begins with a '<' ('u003c'), then the name must be one of the special internal methods (§3,8), either <init> or <clinit>. In this case, the method must return no value.

4.4.3 CONSTANT_String

The CONSTANT_String_info structure is used to represent constant objects of the type java.lang.String:

```
CONSTANT_String_info {
    u1 tag;
    u2 string_index;
}
```

The items of the CONSTANT_String_info structure are as follows:

tag

The tag item of the CONSTANT_String_info structure has the value CONSTANT_String (8).

string_index

The value of the string_index item must be a valid index into the constant_pool table. The constant_pool entry at that index must be a CONSTANT_Utf8_info (§4.4.3) structure representing the sequence of characters to which the java.lang.String object is to be initialized.

4.4.4 CONSTANT_Integer and CONSTANT_Float

The CONSTANT_Integer_info and CONSTANT_Float_info structures represent four-byte numeric (int and float) constants:

```
CONSTANT_Integer_info {
    u1 tag;
    u4 bytes;
}
CONSTANT_Float_info {
    u1 tag;
    u4 bytes;
}
```

The items of these structures are as follows:

tag

The tag item of the CONSTANT_Integer_info structure has the value CONSTANT_Integer (3).

The tag item of the CONSTANT_Float_info structure has the value CONSTANT_Float (4).

bytes

The bytes item of the CONSTANT_Integer_info structure contains the value of the int constant. The bytes of the value are stored in big-endian (high byte first) order.

The bytes item of the CONSTANT_Float_info structure contains the value of the float constant in IEEE 754 floating-point "single format" bit layout. The bytes of the value are stored in big-endian (high byte first) order, and are first converted into an int argument. Then:

If the argument is 0x7f800000, the float value will be positive infinity.

If the argument is 0xff800000, the float value will be negative infinity.

If the argument is in the range 0x7f800001 through 0x7fffffff or in the range 0xff800001 through 0xffffffff, the float value will be NaN.

In all other cases, let s, e, and m be three values that might be computed by
int s=((bytes >> 31) == 0) ? 1 : -1;
int e=((bytes >> 23) & 0xff);
int m=(e == 0) ?
  (bytes & 0x7fffff) << 1 :
  (bytes & 0x7fffff) | 0x800000;

Then the float value equals the result of the mathematical expression $$s \cdot m \cdot 2^{e-150}$$

4.4.5 CONSTANT_Long and CONSTANT_Double

The CONSTANT_Long_info and CONSTANT_Double_info represent eight-byte numeric (long and double) constants:

```
CONSTANT_Long_info {
    u1 tag;
    u4 high_bytes;
    u4 low_bytes;
}
CONSTANT_Double_info {
    u1 tag;
    u4 high_bytes;
    u4 low_bytes;
}
```

All eight-byte constants take up two entries in the constant_pool table of the class file, as well as in the in-memory version of the constant pool that is constructed when a class file is read. If a CONSTANT_Long_info or CONSTANT_Double_info structure is the item in the constant_pool table at index n, then the next valid item in the pool is located at index n+2. The constant_pool index n+1 must be considered invalid and must not be used.[1]

[1] In retrospect, making eight-byte constants take two constant pool entries was a poor choice.

The items of these structures are as follows:

tag

The tag item of the CONSTANT_Long_info structure has the value CONSTANT_Long (5).

The tag item of the CONSTANT_Double_info structure has the value CONSTANT_Double (6).

high_bytes, low_bytes

The unsigned high bytes and low bytes items of the CONSTANT_Long structure together contain the value of the long constant ((long)high_bytes<<32)+low-bytes, where the bytes of each of high_bytes and low_bytes are stored in big-endian (high byte first) order.

The high_bytes and low_bytes items of the CONSTANT_Double_info structure contain the double value in IEEE 754 floating-point "double format" bit layout. The bytes of each item are stored in big-endian (high byte first) order. The high_bytes and low_bytes items are first converted into a long argument. Then:

If the argument is 0x7f80000000000000L, the double value will be positive infinity.

If the argument is 0xff80000000000000L, the double value will be negative infinity.

If the argument is in the range 0x7ff0000000000001L through 0x7fffffffffffffffL or in the range 0xfff0000000000001L through 0xffffffffffffffffL, the double value will be NaN.

In all other cases, let s, e, and m be three values that might be computed from the argument:
int s=((bits >> 63) == 0) ? 1 : -1;
int e=(int)((bits >> 52) & 0x7ffL);
long m=(e == 0) ?
  (bits & 0xfffffffffffffL) << 1 :
  (bits & 0xfffffffffffffL) | 0x10000000000000L;

Then the floating-point value equals the double value of the mathematical expression $$s \cdot m \cdot 2^{e-1075}$$

4.4.6 CONSTANT_NameAndType

The CONSTANT_NameAndType_info structure is used to represent a field or method, without indicating which class or interface type it belongs to:

```
CONSTANT_NameAndType_info {
    u1 tag;
    u2 name_index;
    u2 descriptor_index;
}
```

The items of the CONSTANT_NameAndType_info structure are as follows:

tag

The tag item of the CONSTANT_NameAndType_info structure has the value CONSTANT_NameAndType (12).

name_index

The value of the name_index item must be a valid index into the constant_pool table. The constant_pool entry at that index must be a CONSTANT_Utf8_info (§4.4.7) structure representing a valid Java field name or method name (§2.7) stored as a simple (not fully qualified) name (§2.7.1), that is, as a Java identifier.

descriptor_index

The value of the descriptor_index item must be a valid index into the constant_pool table. The constant_pool entry at that index must be a CONSTANT_Utf 8_info (§4.4.7) structure representing a valid Java field descriptor (§4.3.2) or method descriptor (§4.3.3).

4.4.7 CONSTANT_Utf8

The CONSTANT_Utf8_info structure is used to represent constant string values.

UTF-8 strings are encoded so that character sequences that contain only non-null ASCII characters can be represented using only one byte per character, but characters of up to 16 bits can be represented. All characters in the range 'u0001' to 'u007F' are represented by a single byte:

0 bits 0–7

The seven bits of data in the byte give the value of the character represented. The null character ('u0000') and characters in the range 'u0080', to 'u07FF' are represented by a pair of bytes x and y:

x: 1 1 0 bits 6–10 y: 1 0 bits 0–5

The bytes represent the character with the value ((x & 0x1f) << 6)+(y & 0x3f).

Characters in the range 'u0800' to 'uFFFF' are represented by three bytes x, y, and z:

x: 1 1 1 0 bits 12–15 y: 1 0 bits 6–11 z: 1 0 bits 0–5

The character with the value ((x & 0xf)<<12)+((y & 0x3f)<<6)+(z & 0x3f) is represented by the bytes. The bytes of multibyte characters are stored in the class file in big-endian (high byte first) order. There are two differences between this format and the "standard" UTF-8 format. First, the null byte (byte)0 is encoded using the two-byte format rather than the one-byte format, so that Java Virtual Machine UTF-8 strings never have embedded nulls. Second, only the one-byte, two-byte, and three-byte formats are used. The Java Virtual Machine does not recognize the longer UTF-8 formats.

For more information regarding the UTF-8 format, see *File System Safe UCS Transfonnation Format(FSS_UTF)*, X/Open Preliminary Specification, X/Open Company Ltd., Document Number: P316. This information also appears in ISO/IEC 10646, Annex P.

The CONSTANT_Utf8 _info structure is

```
CONSTANT_Utf8_info {
    u1 tag;
    u2 length;
    u1 bytes[length];
}
```

The items of the CONSTANT_Utf8 _info structure are the following:

tag

The tag item of the CONSTANT_Utf8_info structure has the value CONSTANT_Utf8 (1).

length

The value of the length item gives the number of bytes in the bytes array (not the length of the resulting string). The strings in the CONSTANT_Utf8_info structure are not null-terminated.

bytes[ ]

The bytes array contains the bytes of the string. No byte may have the value (byte)0 or (byte)0xf0–(byte)0xff.

4.5 Fields

Each field is described by a variable-length field_info structure. The format of this structure is

```
field_info {
    u2 access_flags
    u2 name_index;
    u2 descriptor_index;
    u2 attributes_count;
    attribute_info attributes[attributes_count];
}
```

The items of the field_info structure are as follows:

access_flags

The value of the access_flags item is a mask of modifiers used to describe access permission to and properties of a field. The access_flags modifiers are shown in Table 4.3.

| Flag Name | Value | Meaning | Used By |
| --- | --- | --- | --- |
| ACC_PUBLIC | 0x0001 | Is public; may be accessed from outside its package. | Any field |
| ACC_PRIVATE | 0x0002 | Is private; usable only within the defining class. | Class field |
| ACC_PROTECTED | 0x0004 | Is protected; may be accessed within subclasses. | Class field |
| ACC_STATIC | 0x0008 | Is static. | Any field |
| ACC_FINAL | 0x0010 | Is final; no further overriding or assignment after initialization. | Any field |
| ACC_VOLATILE | 0x0040 | Is volatile; cannot be cached. | Class field |
| ACC_TRANSIENT | 0x0080 | Is transient; not written or read by a persistent object manager. | Class field |

Fields of interfaces may only use flags indicated in Table 4.3 as used by any field. Fields of classes may use any of the flags in Table 4.3.

All unused bits of the access_flags item, including those not assigned in Table 4.3, are reserved for future use. They should be set to zero in generated class files and should be ignored by Java Virtual Machine implementations.

Class fields may have at most one of flags ACC_PUBLIC, ACC_PROTECTED, and ACC_PRIVATE set (§2.7.8). A class field may not have both ACC_FINAL and ACC_VOLATILE set (§2.9.1).

Each interface field is implicitly static and final (§2.13.4) and must have both its ACC_STATIC and ACC_FINAL flags set. Each interface field is implicitly public (§2.13.4) and must have its ACC_PUBLIC flag set.

name_index

The value of the name_index item must be a valid index into the constant_pool table. The constant_pool entry at that index must be a CONSTANT_Utf8_info (§4.4.7) structure which must represent a valid Java field name (§2.7) stored as a simple (not fully qualified) name (§2.7.1), that is, as a Java identifier.

descriptor_index

The value of the descriptor_index item must be a valid index into the constant_pool table. The constant_pool entry at that index must be a CONSTANT_Utf8 (§4.4.7) structure which must represent a valid Java field descriptor (§4.3.2).

attributes_count

The value of the attributes_count item indicates the number of additional attributes (§4.7) of this field.

attributes[ ]

Each value of the attributes table must be a variable-length attribute structure. A field can have any number of attributes (§4.7) associated with it.

The only attribute defined for the attributes table of a field_info structure by this specification is the ConstantValue attribute (§4.7.3).

A Java Virtual Machine implementation must recognize ConstantValue attributes in the attributes table of a field_info structure. A Java Virtual Machine implementation is required to silently ignore any or all other attributes in the attributes table that it does not recognize. Attributes not defined in this specification are not allowed to affect the semantics of the class file, but only to provide additional descriptive information (§4.7.1).

4.6 Methods

Each method, and each instance initialization method <init>, is described by a variable-length method_info structure. The structure has the following format:

```
method_info {
    u2 access_flags;
    u2 name_index;
    u2 descriptor_index;
    u2 attributes_count;
    attribute_info attributes [attributes_count];
}
```

The items of the method_info structure are as follows:

access_flags

The value of the access_flags item is a mask of modifiers used to describe access permission to and properties of a method or instance initialization method (3.8). The access_flags modifiers are shown in Table 4.4.

class or instance method may not use ACC_STATIC with ACC_ABSTRACT (that is, a static method is implicitly final and thus cannot be overridden, so such a method could never be implemented or used).

Class and interface initialization methods (§3.8), that is, methods named <clinit>, are called implicitly by the Java Virtual Machine; the value of their access_flags item is ignored.

Each interface method is implicitly abstract, and so must have its ACC_ABSTRACT flag set. Each interface method is implicitly public (§2.13.5), and so must have its ACC_PUBLIC flag set.

name_index

The value of the name_index item must be a valid index into the constant_pool table. The constant_pool entry at that index must be a CONSTANT_Utf8_info (§4.4.7) structure representing either one of the special internal method names (§3.8), either <init>or <clinit>, or a valid Java method name (§2.7), stored as a simple (not fully qualified) name (§2.7.1).

descriptor_index

The value of the descriptor_index item must be a valid index into the constant_pool table. The constant_pool entry at that index must be a CONSTANT_Utf8_info (§4.4.7) structure representing a valid Java method descriptor (§4.3.3).

attributes_count

The value of the attributes_count item indicates the number of additional attributes (§4.7) of this method.

attributes[ ]

Each value of the attributes table must be a variable-length attribute structure. A method can have any number of optional attributes (§4.7) associated with it.

The only attributes defined by this specification for the attributes table of a method_info structure are the Code (§4.7.4) and Exceptions (§4.7.5) attributes.

| Flag Name | Value | Meaning | Used By |
|---|---|---|---|
| ACC_PUBLIC | 0x0001 | Is public; may be accessed from outside its package. | Any method |
| ACC_PRIVATE | 0x0002 | Is private; usable only within the defining class. | Class/instance method |
| ACC_PROTECTED | 0x0004 | Is protected; may be accessed within subclasses. | Class/instance method |
| ACC_STATIC | 0x0008 | Is static. | Class/instance method |
| ACC_FINAL | 0x0010 | Is final; no overriding is allowed. | Class/instance method |
| ACC_SYNCHRONIZED | 0x0020 | Is synchronized; wrap use in monitor lock. | Class/instance method |
| ACC_NATIVE | 0x0100 | Is native; implemented in a language other than Java. | Class/instance method |
| ACC_ABSTRACT | 0x0400 | Is abstract, no implementation is provided. | Any method |

Methods in interfaces may only use flags indicated in Table 4.4 as used by any method. Class and instance methods (§2.10.3) may use any of the flags in Table 4.4. Instance initialization methods (§3.8) may only use ACC_PUBLIC, ACC_PROTECTED, and ACC_PRIVATE.

All unused bits of the access_flags item, including those not assigned in Table 4.4, are reserved for future use. They should be set to zero in generated class files and should be ignored by Java Virtual Machine implementations.

At most one of the flags ACC_PUBLIC, ACC_PROTECTED, and ACC_PRIVATE may be set for any method. Class and instance methods may not use ACC_ABSTRACT together with ACC_FINAL, ACC_NATIVE, or ACC_SYNCHRONIZED (that is, native and synchronized methods require an implementation). A class or instance method may not use ACC_PRIVATE with ACC_ABSTRACT (that is, a private method cannot be overridden, so such a method could never be implemented or used). A A Java Virtual Machine implementation must recognize Code (§4.7.4) and Exceptions (§4.7.5) attributes. A Java Virtual Machine implementation is required to silently ignore any or all other attributes in the attributes table of a method_info structure that it does not recognize. Attributes not defined in this specification are not allowed to affect the semantics of the class file, but only to provide additional descriptive information (§4.7.1).

4.7 Attributes

Attributes are used in the ClassFile (§4.1), field_info (§4.5), method_info (§4.6), and Code_attribute (§4.7.4) structures of the class file format. All attributes have the following general format:

```
attribute_info {
    u2 attribute_name_index;
    u4 attribute_length;
    u1 info[attribute_length];
}
```

For all attributes, the attribute_name_index must be a valid unsigned 16-bit index into the constant pool of the class. The constant_pool entry at attribute_name_index must be a CONSTANT_Utf8 (§4.4.7) string representing the name of the attribute. The value of the attribute_length item indicates the length of the subsequent information in bytes. The length does not include the initial six bytes that contain the attribute_name_index and attribute_length items.

Certain attributes are predefined as part of the class file specification. The predefined attributes are the SourceFile (4.7.2), ConstantValue (§4.7.3), Code (§4.7.4), Exceptions (§4.7.5), LineNumberTable (§4.7.6), and LocalVariableTable (§4.7.7) attributes. Within the context of their use in this specification, that is, in the attributes tables of the class file structures in which they appear, the names of these predefined attributes are reserved.

Of the predefined attributes, the Code, ConstantValue, and Exceptions attributes must be recognized and correctly read by a class file reader for correct interpretation of the class file by a Java Virtual Machine. Use of the remaining predefined attributes is optional; a class file reader may use the information they contain, and otherwise must silently ignore those attributes.

4.7.1 Defining and Naming New Attributes

Compilers for Java source code are permitted to define and emit class files containing new attributes in the attributes tables of class file structures. Java Virtual Machine implementations are permitted to recognize and use new attributes found in the attributes tables of class file structures. However, all attributes not defined as part of this Java Virtual Machine specification must not affect the semantics of class or interface types. Java Virtual Machine implementations are required to silently ignore attributes they do not recognize.

For instance, defining a new attribute to support vendor-specific debugging is permitted. Because Java Virtual Machine implementations are required to ignore attributes they do not recognize, class files intended for that particular Java Virtual Machine implementation will be usable by other implementations even if those implementations cannot make use of the additional debugging information that the class files contain.

Java Virtual Machine implementations are specifically prohibited from throwing an exception or otherwise refusing to use class files simply because of the presence of some new attribute. Of course, tools operating on class files may not run correctly if given class files that do not contain all the attributes they require.

Two attributes that are intended to be distinct, but that happen to use the same attribute name and are of the same length, will conflict on implementations that recognize either attribute. Attributes defined other than by Sun must have names chosen according to the package naming convention defined by *The Java Language Specification*. For instance, a new attribute defined by Netscape might have the name "COM.Netscape.new-attribute".

Sun may define additional attributes in future versions of this class file specification.

4.7.2 SourceFile Attribute

The SourceFile attribute is an optional fixed-length attribute in the attributes table of the ClassFile (§4.1) structure. There can be no more than one SourceFile attribute in the attributes table of a given ClassFile structure.

The SourceFile attribute has the format

```
SourceFile_attribute {
    u2 attribute_name_index;
    u4 attribute_length;
    u2 sourcefile_index;
}
```

The items of the SourceFile_attribute structure are as follows:

attribute_name_index

The value of the attribute_name_index item must be a valid index into the constant_pool table. The constant_pool entry at that index must be a CONSTANT_Utf8_info (§4.4.7) structure representing the string "SourceFile".

attribute_length

The value of the attribute_length item of a SourceFile_attribute structure must be 2.

sourcefile_index

The value of the sourcefile_index item must be a valid index into the constant_pool table. The constant pool entry at that index must be a CONSTANT_Utf8_info (§4.4.7) structure representing the string giving the name of the source file from which this class file was compiled.

Only the name of the source file is given by the SourceFile attribute. It never represents the name of a directory containing the file or an absolute path name for the file. For instance, the SourceFile attribute might contain the file name foo.java but not the UNIX pathname /home/lindholm/foo.java.

4.7.3 ConstantValue Attribute

The Constantvalue attribute is a fixed-length attribute used in the attributes table of the field_info (§4.5) structures. A ConstantValue attribute represents the value of a constant field that must be (explicitly or implicitly) static; that is, the ACC_STATIC bit (§Table 4.3) in the flags item of the field_info structure must be set. The field is not required to be final. There can be no more than one ConstantValue attribute in the attributes table of a given field_info structure. The constant field represented by the field_info structure is assigned the value referenced by its ConstantValue attribute as part of its initialization (§2.16.4).

Every Java Virtual Machine implementation must recognize ConstantValue attributes.

The ConstantValue attribute has the format

```
ConstantValue_attribute {
    u2 attribute_name_index;
    u4 attribute_length;
    u2 constantvalue_index;
}
```

The items of the ConstantValue_attribute structure are as follows:

attribute_name_index

The value of the attribute_name_index item must be a valid index into the constant_pool table. The constant_pool entry at that index must be a CONSTANT_Utf8_info (§4.4.7) structure representing the string "ConstantValue".

attribute_length

The value of the attribute_length item of a ConstantValue_attribute structure must be 2.

constantvalue_index

The value of the constantvalue_index item must be a valid index into the constant_pool table. The constant_pool entry at that index must give the constant value represented by this attribute.

The constant_pool entry must be of a type appropriate to the field, as shown by Table 4.5.

| Field Type | Entry Type |
| --- | --- |
| long | CONSTANT_Long |
| float | CONSTANT_Float |
| double | CONSTANT_Double |
| int, short, char, byte, boolean | CONSTANT_Integer |
| java.lang.String | CONSTANT_String |

4.7.4 Code Attribute

The Code attribute is a variable-length attribute used in the attributes table of method_info structures. A Code attribute contains the Java Virtual Machine instructions and auxiliary information for a single Java method, instance initialization method (§3.8), or class or interface initialization method (§3.8). Every Java Virtual Machine implementation must recognize Code attributes. There must be exactly one Code attribute in each method_info structure.

The Code attribute has the format

```
Code_attribute {
    u2 attribute_name_index;
    u4 attribute_length;
    u2 max_stack
    u2 max_locals;
    u4 code_length;
    u1 code[code_length];
    u2 exception_table_length;
    {   u2 start_pc;
        u2 end_pc;
        u2 handler_pc;
        u2 catch_type;
    }   exception_table[exception_table_length];
    u2 attributes_count;
    attribute_info attributes[attributes_count];
}
```

The items of the Code_attribute structure are as follows:
attribute_name_index

The value of the attribute_name_index item must be a valid index into the constant_pool table. The constant_pool entry at that index must be a CONSTANT_Utf8_info (§4.4.7) structure representing the string "Code".
attribute_length The value of the attribute_length item indicates the length of the attribute, excluding the initial six bytes.
max_stack The value of the max_stack item gives the maximum number of words on the operand stack at any point during execution of this method.
max_locals The value of the max_locals item gives the number of local variables used by this method, including the parameters passed to the method on invocation. The index of the first local variable is 0. The greatest local variable index for a one-word value is max_locals–1. The greatest local variable index for a two-word value is max_locals–2.
code_length The value of the code_length item gives the number of bytes in the code array for this method. The value of code_length must be greater than zero; the code array must not be empty.
code[ ]

The code array gives the actual bytes of Java Virtual Machine code that implement the method.

When the code array is read into memory on a byte addressable machine, if the first byte of the array is aligned on a 4-byte boundary, the tableswitch and lookupswitch 32-bit offsets will be 4-byte aligned; refer to the descriptions of those instructions for more information on the consequences of code array alignment.

The detailed constraints on the contents of the code array are extensive and are given in a separate section (§4.8).
exception_table_length The value of the exception_table_length item gives the number of entries in the exception_table table.
exception_table[ ]

Each entry in the exception_table array describes one exception handler in the code array. Each exception_table entry contains the following items:
start_pc, end_pc The values of the two items start_pc and end_pc indicate the ranges in the code array at which the exception handler is active. The value of start_pc must be a valid index into the code array of the opcode of an instruction. The value of end_pc either must be a valid index into the code array of the opcode of an instruction, or must be equal to code_length, the length of the code array. The value of start_pc must be less than the value of end_pc.

The start_pc is inclusive and end_pc is exclusive; that is, the exception handler must be active while the program counter is within the interval [start_pc, end_pc).[2]

[2] The fact that end_pc is exclusive is an historical mistake in the Java Virtual Machine: if the Java Virtual Machine code for a method is exactly 65535 bytes long and ends with an instruction that is one byte long, then that instruction cannot be protected by an exception handler. A compiler writer can work around this bug by limiting the maximum size of the generated Java Virtual Machine code for any method, instance initialization method, or static initializer (the size of any code array) to 65534 bytes.

handler_pc

The value of the handler_pc item indicates the start of the exception handler. The value of the item must be a valid index into the code array, must be the index of the opcode of an instruction, and must be less than the value of the code_length item.
catch_type If the value of the catch_type item is nonzero, it must be a valid index into the constant_pool table. The constant_pool entry at that index must be a CONSTANT_Class_info (§4.4.1) structure representing a class of exceptions that this exception handler is designated to catch. This class must be the class Throwable or one of its subclasses. The exception handler will be called only if the thrown exception is an instance of the given class or one of its subclasses.

If the value of the catch_type item is zero, this exception handler is called for all exceptions. This is used to implement finally (see Section 7.13, "Compiling finally").
attributes_count The value of the attributes_count item indicates the number of attributes of the Code attribute.
attributes[ ]

Each value of the attributes table must be a variable-length attribute structure. A Code attribute can have any number of optional attributes associated with it.

Currently, the LineNumberTable (§4.7.6) and LocalVariableTable (§4.7.7) attributes, both of which contain debugging information, are defined and used with the Code attribute.

A Java Virtual Machine implementation is permitted to silently ignore any or all attributes in the attributes table of a Code attribute. Attributes not defined in this specification are not allowed to affect the semantics of the class file, but only to provide additional descriptive information (§4.7.1).

4.7.5 Exceptions Attribute

The Exceptions attribute is a variable-length attribute used in the attributes table of a method_info (§4.6 ) structure. The Exceptions attribute indicates which checked exceptions a method may throw. There must be exactly one Exceptions attribute in each method_info structure.

The Exceptions attribute has the format

```
Exceptions_attribute {
    u2 attribute_name_index;
    u4 attribute_length;
    u2 number_of_exceptions;
    u2 exception_index_table[number_of_exceptions];
}
```

The items of the Exceptions_attribute structure are as follows:

attribute_name_index

The value of the attribute_name_index item must be a valid index into the constant_pool table. The constant_pool entry at that index must be the CONSTANT_Utf8_info (§4.4.7) structure representing the string "Exceptions".

attribute_length

The value of the attribute_length item indicates the attribute length, excluding the initial six bytes.

number_of_exceptions

The value of the number_of_exceptions item indicates the number of entries in the exception_index_table.

exception_index_table[ ]

Each nonzero value in the exception_index_table array must be a valid index into the constant_pool table. For each table item, if exception index_table[i] !=0, where 0 £ i<number_of_exceptions, then the constant_pool entry at index exception_index_table[i] must be a CONSTANT_Class_info (4.4.1) structure representing a class type that this method is declared to throw.

A method should only throw an exception if at least one of the following three criteria is met:

The exception is an instance of RuntimeException or one of its subclasses.

The exception is an instance of Error or one of its subclasses.

The exception is an instance of one of the exception classes specified in the exception_index_table above, or one of their subclasses.

The above requirements are not currently enforced by the Java Virtual Machine; they are only enforced at compile time. Future versions of the Java language may require more rigorous checking of throws clauses when classes are verified.

4.7.6 LineNumberTable Attribute

The LineNumberTable attribute is an optional variable-length attribute in the attributes table of a Code (§4.7.4) attribute. It may be used by debuggers to determine which part of the Java Virtual Machine code array corresponds to a given line number in the original Java source file. If LineNumberTable attributes are present in the attributes table of a given Code attribute, then they may appear in any order. Furthermore, multiple LineNumberTable attributes may together represent a given line of a Java source file; that is, LineNumberTable attributes need not be one-to-one with source lines.[3]

[3]The javac compiler in Sun's JDK 1.0.2 release can in fact generate LineNumberTable attributes which are not in line number order and which are not one-to-one with source lines. This is unfortunate, as we would prefer to specify a one-to-one, ordered mapping of LineNumberTable attributes to source lines, but must yield to backward compatibility.

The LineNumberTable attribute has the format

```
LineNumberTable_attributes {
    u2 attribute_name_index;
    u4 attribute_length;
    u2 line_number_table_length;
    {   u2 start_pc;
        u2 line_number
    }   line_number_table[line_number_table_length];
}
```

The items of the LineNumberTable_attribute structure are as follows:

attribute_name_index

The value of the attribute_name_index item must be a valid index into the constant_pool table. The constant_pool entry at that index must be a CONSTANT_Utf8_info (§4.4.7) structure representing the string "LineNumberTable".

attribute_length

The value of the attribute_length item indicates the length of the attribute, excluding the initial six bytes.

line_number_table_length

The value of the line_number_table_length item indicates the number of entries in the line_number_table array.

line_number_table[ ]

Each entry in the line_number_table array indicates that the line number in the original Java source file changes at a given point in the code array. Each entry must contain the following items:

start_pc

The value of the start_pc item must indicate the index into the code array at which the code for a new line in the original Java source file begins. The value of start_pc must be less than the value of the code_length item of the Code attribute of which this LineNumberTable is an attribute.

line_number

The value of the line_number item must give the corresponding line number in the original Java source file.

4.7.7 LocalVariableTable Attribute

The LocalVariableTable attribute is an optional variable-length attribute of a Code (§4.7.4) attribute. It may be used by debuggers to determine the value of a given local variable during the execution of a method. If LocalVariableTable attributes are present in the attributes table of a given Code attribute, then they may appear in any order. There may be no more than one LocalVariableTable attribute per local variable in the Code attribute.

The LocalVariableTable attribute has the format

```
LocalVariableTable_attribute {
    u2 attribute_name_index;
    u4 attribute_length;
    u2 local_variable_table_length;
    {   u2 start_pc;
        u2 length;
        u2 name_index;
        u2 descriptor_index;
        u2 index;
    }   local_variable_table [local_variable_table_length];
}
```

The items of the LocalVariableTable_attribute structure are as follows:

attribute_name_index

The value of the attribute_name_index item must be a valid index into the constant_pool table. The constant_pool entry at that index must be a CONSTANT_Utf8_info (§4.4.7) structure representing the string "LocalVariableTable".

attribute_length

The value of the attribute_length item indicates the length of the attribute, excluding the initial six bytes.

local_variable_table_length

The value of the local_variable_table_length item indicates the number of entries in the local_variable_table array.

local_variable_table[ ]

Each entry in the local_variable_table array indicates a range of code array offsets within which a local variable has a value. It also indicates the index into the local variables of the current frame at which that local variable can be found. Each entry must contain the following items:

start_pc, length

The given local variable must have a value at indices into the code array in the interval [start_pc, start_pc+length], that is, between start_pc and start_pc+length inclusive. The value of start_pc must be a valid index into the code array of this Code attribute of the opcode of an instruction. The value of start_pc+length must be either a valid index into the code array of this Code attribute of the opcode of an instruction, or the first index beyond the end of that code array.

name_index, descriptor_index

The value of the name_index item must be a valid index into the constant_pool table. The constant_pool entry at that index must contain a CONSTANT_Utf8_info (§4.4.7) structure representing a valid Java local variable name stored as a simple name (§2.7.1).

The value of the descriptor_index item must be a valid index into the constant_pool table. The constant_pool entry at that index must contain a CONSTANT_Utf 8_info (§4.4.7) structure representing a valid descriptor for a Java local variable. Java local variable descriptors have the same form as field descriptors (§4.3.2).

index

The given local variable must be at index in its method's local variables. If the local variable at index is a two-word type (double or long), it occupies both index and index+1.

4.8 Constraints on Java Virtual Machine Code

The Java Virtual Machine code for a method, instance initialization method (§3.8), or class or interface initialization method (§3.8) is stored in the code array of the Code attribute of a method_info structure of a class file. This section describes the constraints associated with the contents of the Code_attribute structure.

4.8.1 Static Constraints

The static constraints on a class file are those defining the well-formedness of the file. With the exception of the static constraints on the Java Virtual Machine code of the class file, these constraints have been given in the previous section. The static constraints on the Java Virtual Machine code in a class file specify how Java Virtual Machine instructions must be laid out in the code array, and what the operands of individual instructions must be.

The static constraints on the instructions in the code array are as follows:

The code array must not be empty, so the code_length attribute cannot have the value 0.

The opcode of the first instruction in the code array begins at index 0.

Only instances of the instructions documented in (§6.4) may appear in the code array. Instances of instructions using the reserved opcodes (§6.2), the _quick opcodes documented in Chapter 9, "An Optimization," or any opcodes not documented in this specification may not appear in the code array.

For each instruction in the code array except the last, the index of the opcode of the next instruction equals the index of the opcode of the current instruction plus the length of that instruction, including all its operands. The wide instruction is treated like any other instruction for these purposes; the opcode specifying the operation that a wide instruction is to modify is treated as one of the operands of that wide instruction. That opcode must never be directly reachable by the computation.

The last byte of the last instruction in the code array must be the byte at index code_length_1.

The static constraints on the operands of instructions in the code array are as follows:

The target of each jump and branch instruction (jsr, jsr_w, goto, goto_w, ifeq, ifne, iflt, ifge, ifgt, ifle, ifnull, ifnonnull, if_icmpeq, if_icmpne, if_icmplt, if_icmpge, if_icmpgt, if_icmple, if_acmpeq, if_acmpne) must be the opcode of an instruction within this method. The target of a jump or branch instruction must never be the opcode used to specify the operation to be modified by a wide instruction; a jump or branch target may be the wide instruction itself.

Each target, including the default, of each tableswitch instruction must be the opcode of an instruction within this method. Each tableswitch instruction must have a number of entries in its jump table that is consistent with its low and high jump table operands, and its low value must be less than or equal to its high value. No target of a tableswitch instruction may be the opcode used to specify the operation to be modified by a wide instruction; a tableswitch target may be a wide instruction itself.

Each target, including the default, of each lookupswitch instruction must be the opcode of an instruction within this method. Each lookupswitch instruction must have a number of match-offset pairs that is consistent with its npairs operand. The match-offset pairs must be sorted in increasing numerical order by signed match value. No target of a lookupswitch instruction may be the opcode used to specify the operation to be modified by a wide instruction; a lookupswitch target may be a wide instruction itself The operand of each ldc and ldc_w instruction must be a valid index into the constant_pool table. The constant pool entry referenced by that index must be of type CONSTANT_Integer, CONSTANT_Float, or CONSTANT_String.

The operand of each ldc2_w instruction must be a valid index into the constant_pool table. The constant pool entry referenced by that index must be of type CONSTANT_Long or CONSTANT_double. In addition, the subsequent constant pool index must also be a valid index into the constant pool, and the constant pool entry at that index must not be used.

The operand of each getfield, putfield, getstatic, and putstatic instruction must be a valid index into the constant_pool table. The constant pool entry referenced by that index must be of type CONSTANT_Fieldref.

The index operand of each invokevirtual, invokespecial, and invokestatic instruction must be a valid index into the constant_pool table. The constant pool entry referenced by that index must be of type CONSTANT_Methodref.

Only the invokespecial instruction is allowed to invoke the method <init>, the instance initialization method (§3.8). No other method whose name begins with the character '<' ('u003c') may be called by the method invocation instructions. In particular, the class initialization method <clinit> is never called explicitly from Java Virtual Machine instructions, but only implicitly by the Java Virtual Machine itself.

The index operand of each invokeinterface instruction must be a valid index into the constant_pool table. The constant pool entry referenced by that index must be of type CONSTANT_InterfaceMethodref. The value of the nargs operand of each invokeinterface instruction must be the same as the number of argument words implied by the descriptor of the CONSTANT_NameAndType_info structure referenced by the CONSTANT_InterfaceMethodref constant pool entry. The fourth operand byte of each invokeinterface instruction must have the value zero.

The index operand of each instanceof, checkcast, new, anewarray, and multi-anewarray instruction must be a valid index into the constant_pool table. The constant pool entry referenced by that index must be of type CONSTANT_Class.

No anewarray instruction may be used to create an array of more than 255 dimensions.

No new instruction may reference a CONSTANT_Class constant_pool table entry representing an array class. The new instruction cannot be used to create an array. The new instruction also cannot be used to create an interface or an instance of an abstract class, but those checks are performed at link time.

A multianewarray instruction must only be used to create an array of a type that has at least as many dimensions as the value of its dimensions operand. That is, while a multianewarray instruction is not required to create all of the dimensions of the array type referenced by its CONSTANT_Class operand, it must not attempt to create more dimensions than are in the array type. The dimensions operand of each multianewarray instruction must not be zero.

The atype operand of each newarray instruction must take one of the values T_BOOLEAN (4), T_CHAR (5), T_FLOAT (§6), T_DOUBLE (7), T_BYTE (8), T_SHORT (9), T_INT (10), or T_LONG (11).

The index operand of each iload, fload, aload, istore, fstore, astore, wide, iinc, and ret instruction must be a natural number no greater than max_locals−1.

The implicit index of each iload_<n>, fload_<n>, aload$_{13}$ <n>, istore_<n>, fstore_<n>, and astore_<n> instruction must be no greater than the value of max_locals−1.

The index operand of each lload, dload, lstore, and dstore instruction must be no greater than the value of max_locals−2.

The implicit index of each lload_<n>, dload_<n>, lstore_<n>, and dstore_<n> instruction must be no greater than the value of max_locals−2.

4.8.2 Structural Constraints

The structural constraints on the code array specify constraints on relationships between Java Virtual Machine instructions. The structural constraints are as follows:

Each instruction must only be executed with the appropriate type and number of arguments in the operand stack and local variables, regardless of the execution path that leads to its invocation. An instruction operating on values of type int is also permitted to operate on values of type byte, char, and short. (As noted in §3.11.1, the Java Virtual Machine internally converts values of types byte, char, and short to type int.)

Where an instruction can be executed along several different execution paths, the operand stack must have the same size prior to the execution of the instruction, regardless of the path taken.

At no point during execution can the order of the words of a two-word type (long or double) be reversed or split up. At no point can the words of a two-word type be operated on individually.

No local variable (or local variable pair, in the case of a two-word type) can be accessed before it is assigned a value.

At no point during execution can the operand stack grow to contain more than max_stack words.

At no point during execution can more words be popped from the operand stack than it contains.

Each invokespecial instruction must name only an instance initialization method <init>, a method in this, a private method, or a method in a superclass of this.

When the instance initialization method <init>is invoked, an uninitialized class instance must be in an appropriate position on the operand stack. The <init> method must never be invoked on an initialized class instance.

When any instance method is invoked, or when any instance variable is accessed, the class instance that contains the instance method or instance variable must already be initialized.

There must never be an uninitialized class instance on the operand stack or in a local variable when any backwards branch is taken. There must never be an uninitialized class instance in a local variable in code protected by an exception handler or a finally clause. However, an uninitialized class instance may be on the operand stack in code protected by an exception handler or a finally clause. When an exception is thrown, the contents of the operand stack are discarded.

Each instance initialization method (§3.8), except for the instance initialization method derived from the constructor of class Object, must call either another instance initialization method of this or an instance initialization method of its immediate superclass super before its instance members are accessed. However, this is not necessary in the case of class Object, which does not have a superclass (§2.4.6).

The arguments to each method invocation must be method invocation compatible (§2.6.7) with the method descriptor (§4.3.3).

An abstract method must never be invoked.

Each return instruction must match its method's return type. If the method returns a byte, char, short, or int, only the ireturn instruction may be used. If the method returns a float, long, or double, only an freturn, lreturn, or dreturn instruction, respectively, may be used. If the method returns a reference type, it must do so using an areturn instruction, and the returned value must be assignment compatible (§2.6.6) with the return descriptor (§4.3.3) of the method. All instance initialization methods, static initializers, and methods declared to return void must only use the return instruction.

If getfield or putfield is used to access a protected field of a superclass, then the type of the class instance being accessed must be the same as or a subclass of the current class. If invokevirtual is used to access a protected method of a superclass, then the type of the class instance being accessed must be the same as or a subclass of the current class.

The type of every class instance loaded from or stored into by a getfield or putfield instruction must be an instance of the class type or a subclass of the class type.

The type of every value stored by a putfield or putstatic instruction must be compatible with the descriptor of the field (§4.3.2) of the class instance or class being stored into. If the descriptor type is byte, char, short, or int, then the value must be an int. If the descriptor type is float, long, or double, then the value must be a float, long, or double, respectively. If the descriptor type is a reference type, then the value must be of a type that is assignment compatible (§2.6.6) with the descriptor type.

The type of every value stored into an array of type reference by an aastore instruction must be assignment compatible (§2.6.6) with the component type of the array.

Each athrow instruction must only throw values that are instances of class Throwable or of subclasses of Throwable.

Execution never falls off the bottom of the code array.

No return address (a value of type returnAddress) may be loaded from a local variable.

The instruction following each jsr or jsr_w instruction only may be returned to by a single ret instruction.

No jsr or jsr_w instruction may be used to recursively call a subroutine if that subroutine is already present in the subroutine call chain. (Subroutines can be nested when using try-finally constructs from within a finally clause. For more information on Java Virtual Machine subroutines, see §4.9.6)

Each instance of type returnaddress can be returned to at most once. If a ret instruction returns to a point in the subroutine call chain above the ret instruction corresponding to a given instance of type returnAddress, then that instance can never be used as a return address.

4.9 Verification of Class Files

Even though Sun's Java compiler attempts to produce only class files that satisfy all the static constraints in the previous sections, the Java Virtual Machine has no guarantee that any file it is asked to load was generated by that compiler, or is properly formed. Applications such as Sun's HotJava World Wide Web browser do not download source code which they then compile; these applications download already-compiled class files. The HotJava browser needs to determine whether the class file was produced by a trustworthy Java compiler or by an adversary attempting to exploit the interpreter.

An additional problem with compile-time checking is version skew. A user may have successfully compiled a class, say PurchaseStockOptions, to be a subclass of TradingClass. But the definition of TradingClass might have changed in a way that is not compatible with preexisting binaries since the time the class was compiled. Methods might have been deleted, or had their return types or modifiers changed. Fields might have changed types or changed from instance variables to class variables. The access modifiers of a method or variable may have changed from public to private. For a discussion of these issues, see Chapter 13, "Binary Compatibility," in *The Java Language Specification.*

Because of these potential problems, the Java Virtual Machine needs to verify for itself that the desired constraints hold on the class files it attempts to incorporate. A well-written Java Virtual Machine emulator could reject poorly formed instructions when a class file is loaded. Other constraints could be checked at run time. For example, a Java Virtual Machine implementation could tag runtime data and have each instruction check that its operands are of the right type.

Instead, Sun's Java Virtual Machine implementation verifies that each class file it considers untrustworthy satisfies the necessary constraints at linking time (§2.16.3). Structural constraints on the Java Virtual Machine code are checked using a simple theorem prover.

Linking-time verification enhances the performance of the interpreter. Expensive checks that would otherwise have to be performed to verify constraints at run time for each interpreted instruction can be eliminated. The Java Virtual Machine can assume that these checks have already been performed. For example, the Java Virtual Machine will already know the following:

There are no operand stack overflows or underflows.

All local variable uses and stores are valid.

The arguments to all the Java Virtual Machine instructions are of valid types.

Sun's class file verifier is independent of any Java compiler. It should certify all code generated by Sun's current Java compiler; it should also certify code that other compilers can generate, as well as code that the current compiler could not possibly generate. Any class file that satisfies the structural criteria and static constraints will be certified by the verifier.

The class file verifier is also independent of the Java language. Other languages can be compiled into the class format, but will only pass verification if they satisfy the same constraints as a class file compiled from Java source.

4.9.1 The Verification Process

The class file verifier operates in four passes:

Pass 1: When a prospective class file is loaded (§2.16.2) by the Java Virtual Machine, the Java Virtual Machine first ensures that the file has the basic format of a Java class file. The first four bytes must contain the right magic number. All recognized attributes must be of the proper length. The class file must not be truncated or have extra bytes at the end. The constant pool must not contain any superficially unrecognizable information.

While class file verification properly occurs during class linking (§2.16.3), this check for basic class file integrity is necessary for any interpretation of the class file contents and can be considered to be logically part of the verification process.

Pass 2: When the class file is linked, the verifier performs all additional verification that can be done without looking at the code array of the Code attribute (§4.7.4). The checks performed by this pass include the following:

Ensuring that final classes are not subclassed, and that final methods are not overridden.

Checking that every class (except Object) has a superclass.

Ensuring that the constant pool satisfies the documented static constraints; for example, class references in the constant pool must contain a field that points to a CONSTANT_Utf8 string reference in the constant pool.

Checking that all field references and method references in the constant pool have valid names, valid classes, and a valid type descriptor.

Note that when it looks at field and method references, this pass does not check to make sure that the given field or method actually exists in the given class; nor does it check that the type descriptors given refer to real classes. It only checks that these items are well formed. More detailed checking is delayed until passes 3 and 4.

Pass 3: Still during linking, the verifier checks the code array of the Code attribute for each method of the class file by performing data-flow analysis on each method. The verifier ensures that at any given point in the program, no matter what code path is taken to reach that point:

The operand stack is always the same size and contains the same types of objects.

No local variable is accessed unless it is known to contain a value of an appropriate type.

Methods are invoked with the appropriate arguments.

Fields are assigned only using values of appropriate types.

All opcodes have appropriate type arguments on the operand stack and in the local variables.

For further information on this pass, see Section 4.9.2, "The Bytecode Verifier."

Pass 4: For efficiency reasons, certain tests that could in principle be performed in Pass 3 are delayed until the first time the code for the method is actually invoked. In so doing, Pass 3 of the verifier avoids loading class files unless it has to.

For example, if a method invokes another method that returns an instance of class A, and that instance is only assigned to a field of the same type, the verifier does not bother to check if the class A actually exists. However, if it is assigned to a field of the type B, the definitions of both A and B must be loaded in to ensure that A is a subclass of B.

Pass 4 is a virtual pass whose checking is done by the appropriate Java Virtual Machine instructions. The first time an instruction that references a type is executed, the executing instruction does the following:

Loads in the definition of the referenced type if it has not already been loaded.

Checks that the currently executing type is allowed to reference the type.

Initializes the class, if this has not already been done.

The first time an instruction invokes a method, or accesses or modifies a field, the executing instruction does the following:

Ensures that the referenced method or field exists in the given class.

Checks that the referenced method or field has the indicated descriptor.

Checks that the currently executing method has access to the referenced method or field.

The Java Virtual Machine does not have to check the type of the object on the operand stack. That check has already been done by Pass 3. Errors that are detected in Pass 4 cause instances of subclasses of LinkageError to be thrown.

A Java Virtual Machine is allowed to perform any or all of the Pass 4 steps, except for class or interface initialization, as part of Pass 3; see 2.16. 1. "Virtual Machine Start-up" for an example and more discussion.

In Sun's Java Virtual Machine implementation, after the verification has been performed, the instruction in the Java Virtual Machine code is replaced with an alternative form of the instruction (see Chapter 9, "An Optimization"). For example, the opcode new is replaced with new_quick. This alternative instruction indicates that the verification needed by this instruction has taken place and does not need to be performed again. Subsequent invocations of the method will thus be faster. It is illegal for these alternative instruction forms to appear in class files, and they should never be encountered by the verifier.

4.9.2 The Bytecode Verifier

As indicated earlier, Pass 3 of the verification process is the most complex of the four passes of class file verification. This section looks at the verification of Java Virtual Machine code in more detail.

The code for each method is verified independently. First, the bytes that make up the code are broken up into a sequence of instructions, and the index into the code array of the start of each instruction is placed in an array. The verifier then goes through the code a second time and parses the instructions. During this pass a data structure is built to hold information about each Java Virtual Machine instruction in the method. The operands, if any, of each instruction are checked to make sure they are valid. For instance:

Branches must be within the bounds of the code array for the method.

The targets of all control-flow instructions are each the start of an instruction. In the case of a wide instruction, the wide opcode is considered the start of the instruction, and the opcode giving the operation modified by that wide instruction is not considered to start an instruction. Branches into the middle of an instruction are disallowed.

No instruction can access or modify a local variable at an index greater than the number of local variables that its method indicates it uses.

All references to the constant pool must be to an entry of the appropriate type. For example: the instruction ldc can only be used for data of type int or float, or for instances of class String; the instruction getfield must reference a field.

The code does not end in the middle of an instruction.

Execution cannot fall off the end of the code.

For each exception handler, the starting and ending point of code protected by the handler must be at the beginning of an instruction. The starting point must be before the ending point. The exception handler code must start at a valid instruction, and it may not start at an opcode being modified by the wide instruction.

For each instruction of the method, the verifier records the contents of the operand stack and the contents of the local variables prior to the execution of that instruction. For the operand stack, it needs to know the stack height and the type of each value on it. For each local variable, it needs to know either the type of the contents of that local variable, or that the local variable contains an unusable or unknown value (it might be uninitialized). The bytecode verifier does not need to distinguish between the integral types (e.g., byte, short, char) when determining the value types on the operand stack.

Next, a data-flow analyzer is initialized. For the first instruction of the method, the local variables which represent parameters initially contain values of the types indicated by the method's type descriptor; the operand stack is empty. All other local variables contain an illegal value. For the other instructions, which have not been examined yet, no information is available regarding the operand stack or local variables.

Finally, the data-flow analyzer is run. For each instruction, a "changed" bit indicates whether this instruction needs to be looked at. Initially, the "changed" bit is only set for the first instruction. The data-flow analyzer executes the following loop:

1. Select a virtual machine instruction whose "changed" bit is set. If no instruction remains whose "changed" bit is set, the method has successfully been verified. Otherwise, turn off the "changed" bit of the selected instruction.
2. Model the effect of the instruction on the operand stack and local variables:
   If the instruction uses values from the operand stack, ensure that there are a sufficient number of values on the stack and that the top values on the stack are of an appropriate type. Otherwise, verification fails.
   If the instruction uses a local variable, ensure that the specified local variable contains a value of the appropriate type. Otherwise, verification fails.
   If the instruction pushes values onto the operand stack, ensure that there is sufficient room on the operand stack for the new values. Add the indicated types to the top of the modeled operand stack.
   If the instruction modifies a local variable, record that the local variable now contains the new type.
3. Determine the instructions that can follow the current instruction. Successor instructions can be one of the following:
   The next instruction, if the current instruction is not an unconditional control transfer instruction (for instance goto, return or athrow). Verification fails if it is possible to "fall off" the last instruction of the method.
   The target(s) of a conditional or unconditional branch or switch.
   Any exception handlers for this instruction.
4. Merge the state of the operand stack and local variables at the end of the execution of the current instruction into each of the successor instructions. In the special case of control transfer to an exception handler, the operand stack is set to contain a single object of the exception type indicated by the exception handler information.
   If this is the first time the successor instruction has been visited, record that the operand stack and local variables values calculated in steps 2 and 3 are the state of the operand stack and local variables prior to executing the successor instruction. Set the "changed" bit for the successor instruction.
   If the successor instruction has been seen before, merge the operand stack and local variable values calculated in steps 2 and 3 into the values already there. Set the "changed" bit if there is any modification to the values.
5. Continue at step 1.

To merge two operand stacks, the number of values on each stack must be identical. The types of values on the stacks must also be identical, except that differently typed reference values may appear at corresponding places on the two stacks. In this case, the merged operand stack contains a reference to an instance of the first common superclass or common superinterface of the two types. Such a reference type always exists because the type Object is a supertype of all class and interface types. If the operand stacks cannot be merged, verification of the method fails.

To merge two local variable states, corresponding pairs of local variables are compared. If the two types are not identical, then unless both contain reference values, the verifier records that the local variable contains an unusable value. If both of the pair of local variables contain reference values, the merged state contains a reference to an instance of the first common superclass of the two types.

If the data-flow analyzer runs on a method without reporting a verification failure, then the method has been successfully verified by Pass 3 of the class file verifier.

Certain instructions and data types complicate the data-flow analyzer. We now examine each of these in more detail.

4.9.3 Long Integers and Doubles

Values of the long and double types each take two consecutive words on the operand stack and in the local variables.

Whenever a long or double is moved into a local variable, the subsequent local variable is marked as containing the second half of a long or double. This special value indicates that all references to the long or double must be through the index of the lower-numbered local variable.

Whenever any value is moved to a local variable, the preceding local variable is examined to see if it contains the first word of a long or a double. If so, that preceding local variable is changed to indicate that it now contains an unusable value. Since half of the long or double has been overwritten, the other half must no longer be used.

Dealing with 64-bit quantities on the operand stack is simpler; the verifier treats them as single units on the stack. For example, the verification code for the dadd opcode (add two double values) checks that the top two items on the stack are both of type double. When calculating operand stack length, values of type long and double have length two.

Untyped instructions that manipulate the operand stack must treat values of type double and long as atomic. For example, the verifier reports a failure if the top value on the stack is a double and it encounters an instruction such as pop or dup. The instructions pop2 or dup2 must be used instead.

4.9.4 Instance Initialization Methods and Newly Created Objects

Creating a new class instance is a multistep process. The Java statement

. . .

new myclass(i, j, k);

. . .

can be implemented by the following:

```
. . .
new      #1       // Allocate uninitialized space for myClass
dup               // Duplicate object on the operand stack
iload_1           // Push i
iload_2           // Push j
iload_3           // Push k
invokespecial myClass.<init>     // Initialize object
. . .
```

This instruction sequence leaves the newly created and initialized object on top of the operand stack. (More examples of compiling Java code to the instruction set of the Java Virtual Machine are given in Chapter 7, "Compiling for the Java Virtual Machine.")

The instance initialization method <init>for class myClass sees the new uninitialized object as its this argument in local variable 0. It must either invoke an alternative instance initialization method for class myClass or invoke the initialization method of a superclass on the this object before it is allowed to do anything else with this.

When doing dataflow analysis on instance methods, the verifier initializes local variable 0 to contain an object of the current class, or, for instance initialization methods, local variable 0 contains a special type indicating an uninitialized object. After an appropriate initialization method is invoked (from the current class or the current superclass) on this object, all occurrences of this special type on the verifier's model of the operand stack and in the local variables are replaced by the current class type. The verifier rejects code that uses the new object before it has been initialized or that initializes the object twice. In addition, it ensures that every normal return of the method has either invoked an initialization method in the class of this method or in the direct superclass.

Similarly, a special type is created and pushed on the verifier's model of the operand stack as the result of the Java Virtual Machine instruction new. The special type indicates the instruction by which the class instance was created and the type of the uninitialized class instance created. When an initialization method is invoked on that class instance, all occurrences of the special type are replaced by the intended type of the class instance. This change in type may propagate to subsequent instructions as the dataflow analysis proceeds.

The instruction number needs to be stored as part of the special type, as there may be multiple not-yet-initialized instances of a class in existence on the operand stack at one time. For example, the Java Virtual Machine instruction sequence that implements new InputStream(new Foo( ), new InputStream("foo"))

may have two uninitialized instances of InputStream on the operand stack at once. When an initialization method is invoked on a class instance, only those occurrences of the special type on the operand stack or in the registers that are the same object as the class instance are replaced.

A valid instruction sequence must not have an uninitialized object on the operand stack or in a local variable during a backwards branch, or in a local variable in code protected by an exception handler or a finally clause. Otherwise, a devious piece of code might fool the verifier into thinking it had initialized a class instance when it had, in fact, initialized a class instance created in a previous pass through the loop.

4.9.5 Exception Handlers

Java Virtual Machine code produced from Sun's Java compiler always generates exception handlers such that:

The ranges of instructions protected by two different exception handlers always are either completely disjoint, or else one is a subrange of the other. There is never a partial overlap of ranges.

The handler for an exception will never be inside the code that is being protected.

The only entry to an exception handler is through an exception. It is impossible to fall through or "goto" the exception handler.

These restrictions are not enforced by the class file verifier since they do not pose a threat to the integrity of the Java Virtual Machine. As long as every nonexceptional path to the exception handler causes there to be a single object on the operand stack, and as long as all other criteria of the verifier are met, the verifier will pass the code.

4.9.6 Exceptions and Finally

Given the fragment of Java code

```
...
try {
    startFaucet ( );
    waterLawn ( );
} finally {
    stopFaucet ( );
}
...
``` the Java language guarantees that stopFaucet is invoked (the faucet is turned off) whether we finish watering the lawn or whether an exception occurs while starting the faucet or watering the lawn. That is, the finally clause is guaranteed to be executed whether its try clause completes normally, or completes abruptly by throwing an exception.

To implement the try-finally construct, the Java compiler uses the exception-handling facilities together with two special instructions jsr ("jump to subroutine") and ret ("return from subroutine"). The finally clause is compiled as a subroutine within the Java Virtual Machine code for its method, much like the code for an exception handler. When a jsr instruction that invokes the subroutine is executed, it pushes its return address, the address of the instruction after the jsr that is being executed, onto the operand stack as a value of type returnAddress. The code for the subroutine stores the return address in a local variable. At the end of the subroutine, a ret instruction fetches the return address from the local variable and transfers control to the instruction at the return address.

Control can be transferred to the finally clause (the finally subroutine can be invoked) in several different ways. If the try clause completes normally, the finally subroutine is invoked via a jsr instruction before evaluating the next Java expression. A break or continue inside the try clause that transfers control outside the try clause executes a jsr to the code for the finally clause first. If the try clause executes a return, the compiled code does the following:

1. Saves the return value (if any) in a local variable.
2. Executes a jsr to the code for the finally clause.
3. Upon return from the finally clause, returns the value saved in the local variable.

The compiler sets up a special exception handler which catches any exception thrown by the try clause. If an exception is thrown in the try clause, this exception handler does the following:

1. Saves the exception in a local variable.
2. Executes a jsr to the finally clause.
3. Upon return from the finally clause, rethrows the exception.

For more information about the implementation of Java's try-finally construct, see Section 7.13. "Compiling finally."

The code for the finally clause presents a special problem to the verifier. Usually, if a particular instruction can be reached via multiple paths and a particular local variable contains incompatible values through those multiple paths, then the local variable becomes unusable. However, a finally clause might be called from several different places, yielding several different circumstances:

The invocation from the exception handler may have a certain local variable that contains an exception.

The invocation to implement return may have some local variable that contains the return value.

The invocation from the bottom of the try clause may have an indeterminate value in that same local variable.

The code for the finally clause itself might pass verification, but after updating all the successors of the ret instruction, the verifier would note that the local variable that the exception handler expects to hold an exception, or that the return code expects to hold a return value, now contains an indeterminate value.

Verifying code that contains a finally clause is complicated. The basic idea is the following:

Each instruction keeps track of the list of jsr targets needed to reach that instruction. For most code, this list is empty. For instructions inside code for the finally clause, it is of length one. For multiply nested finally code (extremely rare!), it may be longer than one.

For each instruction and each jsr needed to reach that instruction, a bit vector is maintained of all local variables accessed or modified since the execution of the jsr instruction.

When executing the ret instruction, which implements a return from a subroutine, there must be only one possible subroutine from which the instruction can be returning. Two different subroutines cannot "merge" their execution to a single ret instruction.

To perform the data-flow analysis on a ret instruction, a special procedure is used. Since the verifier knows the subroutine from which the instruction must be returning, it can find all the jsr instructions that call the subroutine and merge the state of the operand stack and local variables at the time of the ret instruction into the operand stack and local variables of the instructions following the jsr. Merging uses a special set of values for the local variables:

For any local variable for which the bit vector (constructed above) indicates that the subroutine has accessed or modified, use the type of the local variable at the time of the ret.

For other local variables, use the type of the local variable before the jsr instruction.

4.10 Limitations of the Java Virtual Machine and Class File Format

The following limitations in the Java Virtual Machine are imposed by this version of the Java Virtual Machine specification:

The per-class constant pool is limited to 65535 entries by the 16-bit constant_pool_count field of the ClassFile structure (§4.1). This acts as an internal limit on the total complexity of a single class.

The amount of code per method is limited to 65535 bytes by the sizes of the indices in the exception_table of the Code attribute (§4.7.4), in the LineNumberTable attribute (§4.7.6), and in the LocalVariableTable attribute (§4.7.7).

The number of local variables in a method is limited to 65535 by the two-byte index operand of many Java Virtual Machine instructions and the size of the max_locals item of the ClassFile structure (§4.1). (Recall that values of type long and double are considered to occupy two local variables.)

The number of fields of a class is limited to 65535 by the size of the fields_count item of the ClassFile structure (§4.1).

The number of methods of a class is limited to 65535 by the size of the methods_count item of the ClassFile structure (§4.1).

The size of an operand stack is limited to 65535 words by the max_stack field of the Code_attribute structure (§4.7.4).

The number of dimensions in an array is limited to 255 by the size of the dimensions opcode of the mulitianewarray instruction, and by the constraints imposed on the multianewarray, anewarray, and newarray instructions by §4.8.2.

A valid Java method descriptor (§4.3.3) must require 255 or fewer words of method arguments, where that limit includes the word for this in the case of instance method invocations. Note that the limit is on the number of words of method arguments, and not on number of arguments themselves. Arguments of type long and double are two words long; arguments of all other types are one word long.

CHAPTER 5

Constant Pool Resolution

Java classes and interfaces are dynamically loaded (§2.16.2), linked (§2.16.3), and initialized A(§2.16.4). Loading is the process of finding the binary form of a class or interface type with a particular name and constructing, from that binary form, a Class object to represent the class or interface. Linking is the process of taking a binary form of a class or interface type and combining it into the runtime state of the Java Virtual Machine so that it can be executed. Initialization of a class consists of executing its static initializers and the initializers for static fields declared in the class.

The Java Virtual Machine performs most aspects of these procedures through operations on a constant pool (§4.4), a per-type runtime data structure that serves many of the purposes of the symbol table of a conventional language. For example, Java Virtual Machine instructions that might otherwise have been designed to take immediate numeric or string operands instead fetch their operands from the constant pool. Classes, methods, and fields, whether referenced from Java Virtual Machine instructions or from other constant pool entries, are named using the constant pool.

A Java compiler does not presume to know the way in which a Java Virtual Machine lays out classes, interfaces, class instances, or arrays. References in the constant pool are always initially symbolic. At run time, the symbolic representation of the reference in the constant pool is used to work out the actual location of the referenced entity. The process of dynamically determining concrete values from symbolic references in the constant pool is known as constant pool resolution. Constant pool resolution may involve loading one or more classes or interfaces, linking several types, and initializing types. There are several kinds of constant pool entries, and the details of resolution differ with the kind of entry to be resolved.

Individual Java Virtual Machine instructions that reference entities in the constant pool are responsible for resolving the entities they reference. Constant pool entries that are referenced from other constant pool entries are resolved when the referring entry is resolved.

A given constant pool entry may be referred to from any number of Java Virtual Machine instructions or other constant pool entries; thus, constant pool resolution can be attempted on a constant pool entry that is already resolved. An attempt to resolve a constant pool entry that has already been successfully resolved always succeeds trivially, and always results in the same entity produced by the initial resolution of that entry.

Constant pool resolution is normally initiated by the execution of a Java Virtual Machine instruction that references the constant pool. Rather than give the full description of the resolution process performed by Java Virtual Machine instructions in their individual descriptions, we will use this chapter to summarize the constant pool resolution process. We will specify the errors that must be detected when resolving each kind of constant pool entry, the order in which those errors must be responded to, and the errors thrown in response.

When referenced from the context of certain Java Virtual Machine instructions, additional constraints are put on linking operations. For instance, the getfield instruction requires not only that the constant pool entry for the field it references can be successfully resolved, but also that the resolved field is not a class (static) field. If it is a class field, an exception must be thrown. Linking exceptions that are specific to the execution of a particular Java Virtual Machine instruction are given in the description of that instruction and are not covered in this general discussion of constant pool resolution. Note that such exceptions, although described as part of the execution of Java Virtual Machine instructions rather than constant pool resolution, are still properly considered failure of the linking phase of Java Virtual Machine execution.

The Java Virtual Machine specification documents and orders all exceptions that can arise as a result of constant pool resolution. It does not mandate how they should be detected, only that they must be. In addition, as mentioned in §6.3, any of the virtual machine errors listed as subclasses of VirtualMachineError may be thrown at any time during constant pool resolution.

5.1 Class and Interface Resolution

A constant pool entry tagged as CONSTANT_Class (§4.4.1) represents a class or interface. Various Java Virtual Machine instructions reference CONSTANT_Class entries in the constant pool of the class that is current upon their execution (§3.6). Several other kinds of constant pool entries (§4.4.2) reference CONSTANT_Class entries and cause those class or interface references to be resolved when the referencing entries are resolved. For instance, before a method reference (a CONSTANT_Methodref constant pool entry) can be resolved, the reference it makes to the class of the method (via the class_index item of the constant pool entry) must first be resolved.

If a class or interface has not been resolved already, the details of the resolution process depend on what kind of entity is represented by the CONSTANT_Class entry being resolved. Array classes are handled differently from non-array classes and from interfaces. Details of the resolution process also depend on whether the reference prompting the resolution of this class or interface is from a class or interface that was loaded using a class loader (§2.16.2).

The name_index item of a CONSTANT_Class constant pool entry is a reference to a CONSTANT_Utf8 constant pool entry (§4.4.7) for a UTF-8 string that represents the fully qualified name (§2.7.9) of the class or interface to be resolved. What kind of entity is represented by a CONSTANT_Class constant pool entry, and how to resolve that entry, is determined as follows:

If the first character of the fully qualified name of the constant pool entry to be resolved is not a left bracket ("["), then the entry is a reference to a non-array class or to an interface.

If the current class (§3.6) has not been loaded by a class loader, then "normal" class resolution is used (§5.1.1).

If the current class has been loaded by a class loader, then application-defined code is used (§5.1.2) to resolve the class.

If the first character of the fully qualified name of the constant pool entry to be resolved is a left bracket ("["), then the entry is a reference to an array class. Array classes are resolved specially (§5.1.3).

5.1.1 Current Class or Interface Not Loaded by a Class Loader

If a class or interface that has been loaded, and that was not loaded using a class loader, references a non-array class or interface C, then the following steps are performed to resolve the reference to C:

1. The class or interface C and its superclasses are first loaded (§2.16.2).

2. If class or interface C has not been loaded yet, the Java Virtual Machine will search for a file C.class and attempt to load class or interface C from that file. Note that there is no guarantee that the file C.class will actually contain the class or interface C, or that the file C.class is even a valid class file. It is also possible that class or interface C might have already been loaded, but not yet initialized. This phase of loading must detect the following errors:

If no file with the appropriate name can be found and read, class or interface resolution throws a NoClassDefFoundError.

Otherwise, if it is determined that the selected file is not a well-formed class file (pass 1 of §4.9.1), or is not a class file of a supported major or minor version (§4.1, class or interface resolution throws a NoClassDefFoundError.

Otherwise, if the selected class file did not actually contain the desired class or interface, class or interface resolution throws a NoClassDefFoundError.

Otherwise, if the selected class file does not specify a superclass and is not the class file for class Object, class or interface resolution throws a ClassFormatError.

3. If the superclass of the class being loaded has not yet been loaded, it is loaded using this step 1 recursively. Loading a superclass must detect any of the errors in step 1a, where this superclass is considered to be the class being loaded. Note that all interfaces must have java. lang. Object as their superclass, which must already have been loaded.

4. If loading class C and its superclasses was successful, the superclass (and thus its superclasses, if any) of class C is linked and initialized by applying steps -2–4 recursively.

5. The class C is linked (§2.16.3), that is, it is verified (§4.9) and prepared.

6. First, the class or interface C is verified to ensure that its binary representation is structurally valid (passes 2 and 3 of §4.9.1).[1] Verification may itself cause classes and interfaces to be loaded, but not initialized (to avoid circularity), using the procedure in step 1.

[1]Sun's JDK release 1.0.2 only verifies class files that have class loaders; it assumes that class files loaded locally are trusted and do not need verification.

If the class or interface C contained in class file C.class does not satisfy the static or structural constraints on valid class files listed in Section 4.8, "Constraints on Java Virtual Machine Code," class or interface resolution throws a VerifyError.

7. If the class file for class or interface C is successfully verified, the class or interface is prepared. Preparation involves creating the static fields for the class or interface and initializing those fields to their standard default values (§2.5.1). Preparation should not be confused with the execution of static initializers (§2.11); unlike execution of static initializers, preparation does not require the execution of any Java code. During preparation:

If a class that is not declared abstract has an abstract method, class resolution throws an AbstractMethodError.

8. Certain checks that are specific to individual Java Virtual Machine instructions, but that are logically related to this phase of constant pool resolution, are described in the documentation of those instructions. For instance, the getfield instruction resolves its field reference, and only afterward checks to see whether that field is an instance field (that is, it is not static). Such exceptions are still considered and documented to be linking, not runtime, exceptions.

9. Next, the class is initialized. Details of the initialization procedure are given in §2.16.5 and in *The Java Language Specification.*

If an initializer completes abruptly by throwing some exception E, and if the class of E is not Error or one of its subclasses, then a new instance of the class ExceptionInInitializerError, with E as the argument, is created and used in place of E.

If the Java Virtual Machine attempts to create a new instance of the class ExceptionInInitializerError but is unable to do so because an Out-Of--Memory-Error occurs, then the OutofMemoryError object is thrown instead.

10. Finally, access permissions to the class being resolved are checked:

If the current class or interface does not have permission to access the class or interface being resolved, class or interface resolution throws an IllegalAccess-Error. This condition can occur, for example, if a class that is originally declared public is changed to be private after another class that refers to the class has been compiled.

If none of the preceding errors were detected, constant pool resolution of the class or interface reference must have completed successfully. However, if an error was detected, one of the following must be true.

If some exception is thrown in steps 1–4, the class being resolved must have been marked as unusable or must have been discarded.

If an exception is thrown in step 5, the class being resolved is still valid and usable.

In either case, the resolution fails, and the class or interface attempting to perform the resolution is prohibited from accessing the referenced class or interface.

5.1.2 Current Class or Interface Loaded by a Class Loader

If a class or interface, loaded using a class loader, references a non-array class or interface C, then that same class loader is used to load C. The loadClass method of that class loader is invoked on the fully qualified path name (§2.7.9) of the class to be resolved. The value returned by the loadClass method is the resolved class. The remainder of the section describes this process in more detail.

Every class loader is an instance of a subclass of the abstract class ClassLoader. Applications implement subclasses of ClassLoader in order to extend the manner in which the Java Virtual Machine dynamically loads classes. Class loaders can be used to create classes that originate from sources other than files. For example, a class could be downloaded across a network, it could be generated on the fly, or it could be decrypted from a scrambled file.

The Java Virtual Machine invokes the loadClass method of a class loader in order to cause it to load (and optionally link and initialize) a class. The first argument to loadclass is the fully qualified name of the class to be loaded. The second argument is a boolean. The value false indicates that the specified class must be loaded, but not linked or initialized; the value true indicates the class must be loaded, linked, and initialized.

Implementations of class loaders are required to keep track of which classes they have already loaded, linked, and initialized:[2]

[2]Future implementations may change the API between the Java Virtual Machine and the class ClassLoader. Specifically, the Java Virtual Machine rather than the class loader will keep track of which classes and interfaces have been loaded by a particular class loader. One possibility is that the loadClass method will be called with a single argument indicating the class or interface to be loaded. The virtual machine will handle the details of linking and initialization and ensure that the class loader is not invoked with the same class or interface name multiple times.

If a class loader is asked to load (but not link or initialize) a class or interface that it has already loaded (and possibly already linked and initialized), then it should simply return that class or interface.

If a class loader is asked to load, link, and initialize a class or interface that it has already loaded but not yet linked and initialized, the class loader should not reload the class or interface, but should only link and initialize it.

If a class loader is asked to load, link, and initialize a class or interface that it has already loaded, linked, and initialized, the class loader should simply return that class or interface.

When the class loader's loadClass method is invoked with the name of a class or interface that it has not yet loaded, the class loader must perform one of the following two operations in order to load the class or interface:

The class loader can create an array of bytes representing the bytes of a file of class file format; it then must invoke the method defineClass of class ClassLoader on those bytes to convert them into a class or interface with this class loader as the class loader for the newly defined class. Invoking define-Class causes the Java Virtual Machine to perform step 1a of §5.1.1.

Invoking defineClass then causes the loadClass method of the class loader to be invoked recursively in order to load the superclass of the newly defined class or interface. The fully qualified path name of the superclass is derived from the super_class item in the class file format. When the superclass is loaded in, the second argument to loadClass is false, indicating that the superclass is not to be linked and initialized immediately.

The class loader can also invoke the static method findSystemClass in class ClassLoader with the fully qualified name of the class or interface to be loaded. Invoking this method causes the Java Virtual Machine to perform step 1 of §5.1.1. The resulting class file is not marked as having been loaded by a class loader.

After the class or interface and its superclasses have been loaded successfully, if the second argument to loadClass is true the class or interface is linked and initialized. This second argument is always true if the class loader is being called upon to resolve an entry in the constant pool of a class or interface. The class loader links and initializes a class or interface by invoking the method resolveClass in the class ClassLoader. Linking and initializing a class or interface created by a class loader is very similar to linking and initializing a class or interface without a class loader (steps 2–4 of 5.1.1):

First, the superclass of the class or interface is linked and initialized by calling the loadClass method of the class loader with the fully qualified name of the superclass as the first argument, and true as the second argument. Linking and initialization may result in the superclass's own superclass being linked and initialized. Linking and initialization of a superclass must detect any of the errors of step 3 of §5.1.1.

Next, the bytecode verifier is run on the class or interface being linked and initialized. The verifier may itself need classes or interfaces to be loaded, and if so, it loads them by invoking the loadclass method of the same class loader with the second argument being false. Since verification may itself cause classes or interfaces to be loaded (but not linked or initialized, to avoid circularity), it must detect the errors of step 1 of §5.1.1. for any classes or interfaces it attempts to load. Running the verifier may also cause the errors of step 3a of §5.1.1.

If the class file is successfully verified, the class or interface is then prepared (step 3b of §5.1.1) and initialized (step 4 of §5.1.1).

Finally, access permissions to the class or interface are checked (step 5 of §5.1.1). If the current class or interface does not have permission to access the class being resolved, class resolution throws an IllegalAccessError exception.

If none of the preceding errors were detected, loading, linking, and initialization of the class or interface must have completed successfully.

5.1.3 Array Classes

A constant pool entry tagged as CONSTANT_Class (§4.4.1) represents an array class if the first character of the UTF-8 string (§4.4.7) referenced by the name_index item of that constant pool entry is a left bracket ("["). The number of initial consecutive left brackets in the name represents the number of dimensions of the array class. Following the one or more initial consecutive left brackets is a field descriptor (§4.3.2) representing either a primitive type or a non-array reference type; this field descriptor represents the base type of the array class.

The following steps are performed to resolve an array class referenced from the constant pool of a class or interface:

1. Determine the number of dimensions of the array class and the field descriptor that represents the base type of the array class.
2. Determine the base type of the array class:
    If the field descriptor represents a primitive type (its first character is not "L"), that primitive type is the base type of the array class.
    If the field descriptor represents a non-array reference type (its first character is "L"), that reference type is the base type of the array class. The reference type is itself resolved using the procedures indicated above in §5.1.1 or in §5.1.2.
1. If an array class representing the same base type and the same number of dimensions has already been created, the result of the resolution is that array class. Otherwise, a new array class representing the indicated base type and number of dimensions is created.

5.2 Field and Method Resolution

A constant pool entry tagged as CONSTANT_Fieldref (§4.4.2) represents a class or instance variable (§2.9) or a (constant) field of an interface (§2.13.4). Note that interfaces do not have instance variables. A constant pool entry tagged as CONSTANT_Methodref (§4.4.2) represents a method of a class (a static method) or of a class instance (an instance method). References to interface methods are made using CONSTANT_InterfaceMethodref constant pool entries; resolution of such entries is described in §5.3.

To resolve a field reference or a method reference, the CONSTANT_Class (§4.4.1) entry representing the class of which the field or method is a member must first be successfully resolved (§5.1) Thus, any exception that can be thrown when resolving a CONSTANT_Class constant pool entry can also be thrown as a result of resolving a CONSTANT_Fieldref or CONSTANT_Methodref entry. If the CONSTANT_Class entry representing the class or interface can be successfully resolved, exceptions relating to the linking of the method or field itself can be thrown. When resolving a field reference:

If the referenced field does not exist in the specified class or interface, field resolution throws a NoSuchFieldError.

Otherwise, if the current class does not have permission to access the referenced field, field resolution throws an IllegalAccessError exception.

If resolving a method:

If the referenced method does not exist in the specified class or interface, field resolution throws a NoSuch-MethodError.

Otherwise, if the current class does not have permission to access the method being resolved, method resolution throws an IllegalAccessError exception.

5.3 Interface Method Resolution

A constant pool entry tagged as CONSTANT_InterfaceMethodref (§4.4.2) represents a call to an instance method declared by an interface. Such a constant pool entry is resolved by converting it into a machine-dependent internal format. No error or exception is possible except for those documented in §6.3.

5.4 String Resolution

A constant pool entry tagged as CONSTANT_String (§4.4.3) represents an instance of a string literal (§2.3), that is, a literal of the built-in type java.lang.String. The Unicode characters (§2.1) of the string literal represented by the CONSTANT_String entry are found in the CONSTANT_Utf8 (§4.4.7) constant pool entry that the CONSTANT_String entry references.

The Java language requires that identical string literals (that is, literals that contain the same sequence of Unicode characters) must reference the same instance of class String. In addition, if the method intern is called on any string, the result is a reference to the same class instance that would be returned if that string appeared as a literal. Thus, $$("a" + "b" + "c").intern( ) == "abc"$$

must have the value true.[3]

[3]String literal resolution is not implemented correctly in Sun's JDK release 1.0.2. In that implementation of the Java Virtual Machine, resolving a CONSTANT_String in the constant pool always allocates a new string. Two string literals in two different classes, even if they contained the identical sequence of characters, would never be == to each other. A string literal could never be == to a result of the intern method.

To resolve a constant pool entry tagged CONSTANT_String, the Java Virtual Machine examines the series of Unicode characters represented by the UTF-8 string that the CONSTANT_String entry references.

If another constant pool entry tagged CONSTANT_String and representing the identical sequence of Unicode characters has already been resolved, then the result of resolution is a reference to the instance of class String created for that earlier constant pool entry.

Otherwise, if the method intern has previously been called on an instance of class String containing a sequence of Unicode characters identical to that represented by the constant pool entry, then the result of resolution is a reference to that same instance of class String.

Otherwise, a new instance of class String is created containing the sequence of Unicode characters represented by the CONSTANT_String entry; that class instance is the result of resolution.

No error or exception is possible during string resolution except for those documented in §6.3.

5.5 Resolution of Other Constant Pool Items

Constant pool entries that are tagged CONSTANT_Integer or CONSTANT_Float (§4.4.4), CONSTANT_Long or CONSTANT_Double (§4.4.5) all have values that are directly represented within the constant pool. Their resolution cannot throw exceptions except for those documented in §6.3.

Constant pool entries that are tagged CONSTANT_NameAndType (§4.4.6), and CONSTANT_Utf8 (§4.4.7) are never resolved directly. They are only referenced directly or indirectly by other constant pool entries.

We claim:

1. A method of pre-processing class files comprising:

determining plurality of duplicated elements in a plurality of class files;

forming a shared table comprising said plurality of duplicated elements;

removing said duplicated elements from said plurality of class files to obtain a plurality of reduced class files; and forming a multi-class file comprising said plurality of reduced class files and said shared table.

2. The method of claim 1, further comprising:

computing an individual memory allocation requirement for each of said plurality of reduced class files;

computing a total memory allocation requirement for said plurality of class files from said individual memory allocation requirement of each of said plurality of reduced class files; and storing said total memory allocation requirement in said multi-class file.

3. The method of claim 2, further comprising:

reading said total memory allocation requirement from said multi-class file;

allocating a portion of memory based on said total memory allocation requirement; and loading said reduced class files and said shared table into said portion of memory.

4. The method of claim 3, further comprising:

accessing said shared table in said portion of memory to obtain one or more elements not found in one or more of said reduced class files.

5. The method of claim 1, wherein said step of determining a plurality of duplicated elements comprises:

determining one or more constants shared between two or more class files.

6. The method of claim 5, wherein said step of forming a shared table comprises:

forming a shared constant table comprising said one or more constants shared between said two or more class files.

7. A computer program product comprising:

a computer usable medium having computer readable program code embodied therein for pre-processing class files, said computer program product comprising:

computer readable program code configured to cause a computer to determine a plurality of duplicated elements in a plurality of class files;

computer readable program code configured to cause a computer to form a shared table comprising said plurality of duplicated elements;

computer readable program code configured to cause a computer to remove said duplicated elements from said plurality of class files to obtain a plurality of reduced class files; and computer readable program code configured to cause a computer to form a multi-class file comprising said plurality of reduced class files and said shared table.

8. The computer program product of claim 7, further comprising:

computer readable program code configured to cause a computer to compute an individual memory allocation requirement of each of said plurality of reduced class files;

computer readable program code configured to cause a computer to compute a total memory allocation requirement of said plurality of class files from said individual memory allocation requirement of each of said plurality of reduced class files; and computer readable program code configured to cause a computer to store said total memory allocation requirement in said multi-class file.

9. The computer program product of claim 8, further comprising:

computer readable program code configured to cause a computer to read said total memory allocation requirement from said multi-class file;

computer readable program code configured to cause a computer to allocate a portion of memory based on said total memory allocation requirement; and computer readable program code configured to cause a computer to load said reduced class files and said shared table into said portion of memory.

10. The computer program product of claim 9, further comprising:

computer readable program code configured to cause a computer to access said shared table in said portion of memory to obtain one or more elements not found in one or more of said reduced class files.

11. The computer program product of claim 7, wherein said computer readable program code configured to cause a computer to determine said plurality of duplicated elements comprises:

computer readable program code configured to cause a computer to determine one or more constants shared between two or more class files.

12. The computer program product of claim 11, wherein said computer readable program code configured to cause a computer to form said shared table comprises:

computer readable program code configured to cause a computer to form a shared constant table comprising said one or more constants shared between said two or more class files.

13. An apparatus comprising:

a processor;

a memory coupled to said processor;

a plurality of class files stored in said memory;

a process executing on said processor, said process configured to form a multi-class file comprising:

a plurality of reduced class files obtained from said plurality of class files by removing one or more elements that are duplicated between two or more of said plurality of class files; and a shared table comprising said duplicated elements.

14. The apparatus of claim 13, wherein said multi-class file further comprises a memory requirement, said memory requirement being computed by said process.

15. The apparatus of claim 13, wherein said duplicated elements comprise elements of constant pools of respective class files, said shared table comprising a shared constant pool.

16. The apparatus of claim 13, further comprising:

a virtual machine having a class loader and a runtime data area, said class loader configured to obtain and load said multi-class file into said runtime data area.

17. The apparatus of claim 16, wherein said class loader is configured to allocate a portion of said runtime data area based on said memory requirement in said multi-class file.

18. The apparatus of claim 17, wherein said class loader is configured to load said plurality of reduced class files and said shared table into said portion of said runtime data area.

19. The apparatus of claim 16, wherein said virtual machine is configured to access said shared table when a desired element associated with a first class file is not present in a corresponding one of said plurality of reduced class files.

20. A memory configured to store data for access by a virtual machine executing in a computer system, comprising:

a data structure stored in said memory, said data structure comprising:

a plurality of reduced class files associated with a plurality of corresponding classes, said plurality of reduced class files configured to be loaded by the virtual machine for execution of said plurality of classes;

a shared table comprising one or more elements that are duplicated between two or more of said plurality of classes, said shared table configured to be loaded into the virtual machine to be accessed for said duplicated elements; and a memory requirement value configured to be read by a class loader of the virtual machine to allocate a portion of a runtime data area for loading said plurality of reduced class files and said shared table.

21. The memory of claim 20, wherein said duplicated elements are removed from said plurality of reduced class files.

22. The memory of claim 20, wherein said duplicated elements comprise constants and said shared table comprises a shared constant pool.

23. The memory of claim 20, wherein said memory requirement value is computed from individual memory requirements of said plurality of reduced class files and a memory requirement of said shared table.

* * * * *

US005966702C1

(12) EX PARTE REEXAMINATION CERTIFICATE (9049th)
United States Patent
Fresko et al.

(10) Number: US 5,966,702 C1
(45) Certificate Issued: Jun. 5, 2012

(54) METHOD AND APPARATUS FOR PRE-PROCESSING AND PACKAGING CLASS FILES

(75) Inventors: Nedim Fresko, San Francisco, CA (US); Richard Tuck, San Francisco, CA (US)

(73) Assignee: Sun Microsystems, Inc., Palo Alto, CA (US)

Reexamination Request:
No. 90/011,492, Feb. 15, 2011

Reexamination Certificate for:
Patent No.: 5,966,702
Issued: Oct. 12, 1999
Appl. No.: 08/961,874
Filed: Oct. 31, 1997

(51) Int. Cl.
*G06F 9/445* (2006.01)

(52) U.S. Cl. .................. 707/692; 707/1; 707/2; 707/8; 707/10; 707/102

(58) Field of Classification Search .................. None
See application file for complete search history.

(56) References Cited

To view the complete listing of prior art documents cited during the proceeding for Reexamination Control Number 90/011,492, please refer to the USPTO's public Patent Application Information Retrieval (PAIR) system under the Display References tab.

*Primary Examiner* — Mary Steelman

(57) ABSTRACT

A method and apparatus for pre-processing and packaging class files. Embodiments remove duplicate information elements from a set of class files to reduce the size of individual class files and to prevent redundant resolution of the information elements. Memory allocation requirements are determined in advance for the set of classes as a whole to reduce the complexity of memory allocation when the set of classes are loaded. The class files are stored in a single package for efficient storage, transfer and processing as a unit. In an embodiment, a pre-processor examines each class file in a set of class files to locate duplicate information in the form of redundant constants contained in a constant pool. The duplicate constant is placed in a separate shared table, and all occurrences of the constant are removed from the respective constant pools of the individual class files. During pre-processing, memory allocation requirements are determined for each class file, and used to determine a total allocation requirement for the set of class files. The shared table, the memory allocation requirements and the reduced class files are packaged as a unit in a multi-class file.

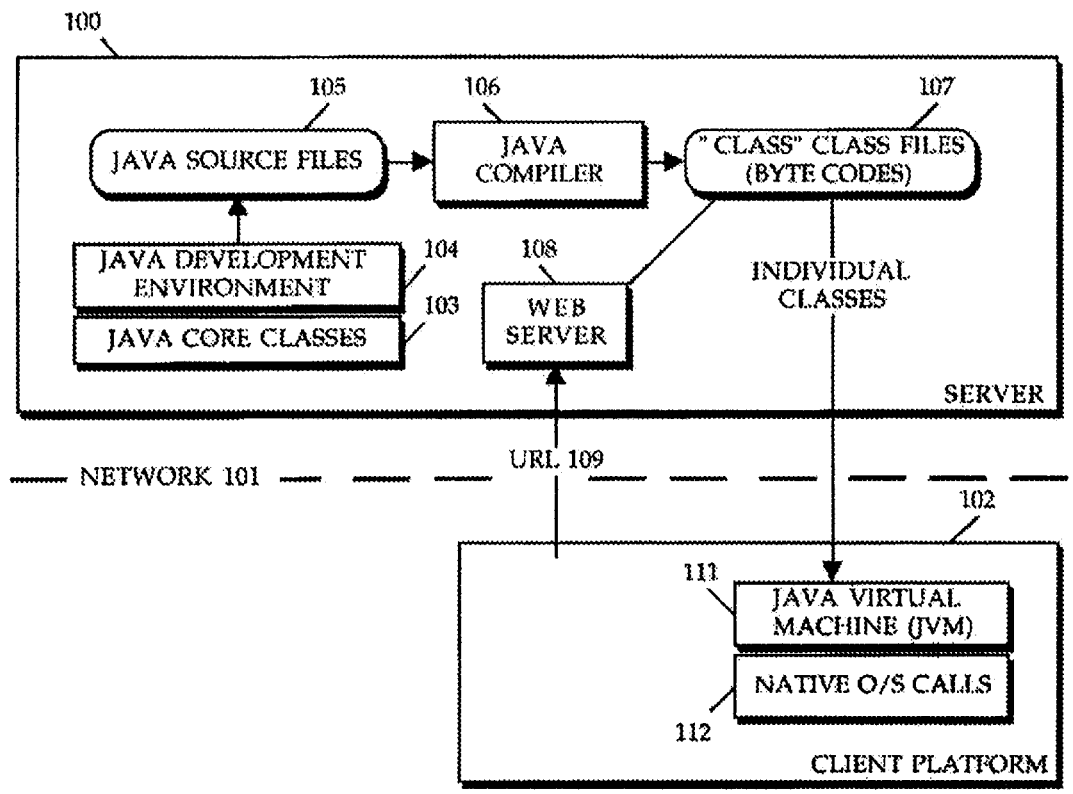

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 5-7, 11-13, 15 and 16 is confirmed.

Claims 2-4, 8-10, 14, 17-22 and 23 were not reexamined.

* * * * *